US012464200B2

United States Patent
Nielsen et al.

(10) Patent No.: US 12,464,200 B2
(45) Date of Patent: *Nov. 4, 2025

(54) APPARATUS AND METHODS TO ASSOCIATE DIFFERENT WATERMARKS DETECTED IN MEDIA

(71) Applicant: The Nielsen Company (US), LLC, New York, NY (US)

(72) Inventors: Christen V. Nielsen, Palm Harbor, FL (US); David Gish, Riverdale, NJ (US); Ken Joseph Frett, Tampa, FL (US); Timothy Scott Cooper, Oldsmar, FL (US); Alexander Topchy, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,797

(22) Filed: Jul. 9, 2024

(65) Prior Publication Data

US 2024/0364979 A1 Oct. 31, 2024

Related U.S. Application Data

(63) Continuation of application No. 17/833,703, filed on Jun. 6, 2022, now Pat. No. 12,041,319, which is a
(Continued)

(51) Int. Cl.
*H04N 21/8358* (2011.01)
*G06F 21/16* (2013.01)
(Continued)

(52) U.S. Cl.
CPC ........ *H04N 21/8358* (2013.01); *G06F 21/16* (2013.01); *H04N 21/44222* (2013.01); *H04N 21/8456* (2013.01)

(58) Field of Classification Search
None
See application file for complete search history.

(56) References Cited

U.S. PATENT DOCUMENTS 6,295,647 B1 * 9/2001 Ramaswamy ....... H04N 21/435
725/136
6,337,882 B1 * 1/2002 Boyer ................ H04N 21/4728
375/240.26
(Continued)

OTHER PUBLICATIONS

United States Patent and Trademark Office, "Non-Final Office Action," issued in connection with U.S. Appl. No. 18/807,271, mailed on Jul. 30, 2025, 06 pages.

*Primary Examiner* — Daniel T Tekle

(57) ABSTRACT

Methods, apparatus, systems and articles of manufacture are disclosed for associating different watermarks detected in media. An example method disclosed herein includes determining whether a first watermark detected in a media signal is represented in a watermark data structure and associating the first watermark with a first media presentation record associated with a second watermark in response to the first watermark being associated in the watermark data structure with the second watermark. The example method further includes transmitting monitoring data including the first media presentation record to an audience measurement entity.

20 Claims, 9 Drawing Sheets

Related U.S. Application Data continuation of application No. 16/231,060, filed on Dec. 21, 2018, now Pat. No. 11,356,747.

(51) Int. Cl.
*H04N 21/442* (2011.01)
*H04N 21/845* (2011.01)

(56) References Cited

U.S. PATENT DOCUMENTS

| | | | |
|---|---|---|---|
| 11,356,747 B2* | 6/2022 | Nielsen | H04N 21/8358 |
| 2002/0126914 A1* | 9/2002 | Kotake | G06T 15/205 |
| | | | 382/284 |
| 2009/0110373 A1* | 4/2009 | Aoyagi | H04N 5/60 |
| | | | 386/353 |
| 2009/0138484 A1* | 5/2009 | Ramos | G06F 16/00 |
| 2012/0265735 A1* | 10/2012 | McMillan | H04N 21/6125 |
| | | | 707/E17.014 |
| 2013/0125155 A1* | 5/2013 | Bhagavathy | H04N 21/24 |
| | | | 725/10 |
| 2013/0141523 A1* | 6/2013 | Banta | H04N 21/4728 |
| | | | 348/36 |
| 2013/0227595 A1* | 8/2013 | Nielsen | H04N 21/4394 |
| | | | 725/11 |
| 2014/0059591 A1* | 2/2014 | Terpstra | H04N 21/435 |
| | | | 725/32 |
| 2015/0264299 A1* | 9/2015 | Leech | H04N 7/0117 |
| | | | 348/78 |
| 2015/0269362 A1* | 9/2015 | Tehranchi | H04N 21/8358 |
| | | | 382/100 |
| 2016/0373734 A1* | 12/2016 | Cole | H04N 13/232 |
| 2018/0225537 A1* | 8/2018 | Cole | G06V 10/25 |
| 2019/0311726 A1* | 10/2019 | Frett | H04N 21/8547 |
| 2022/0321978 A1* | 10/2022 | Nielsen | H04N 21/6582 |

\* cited by examiner

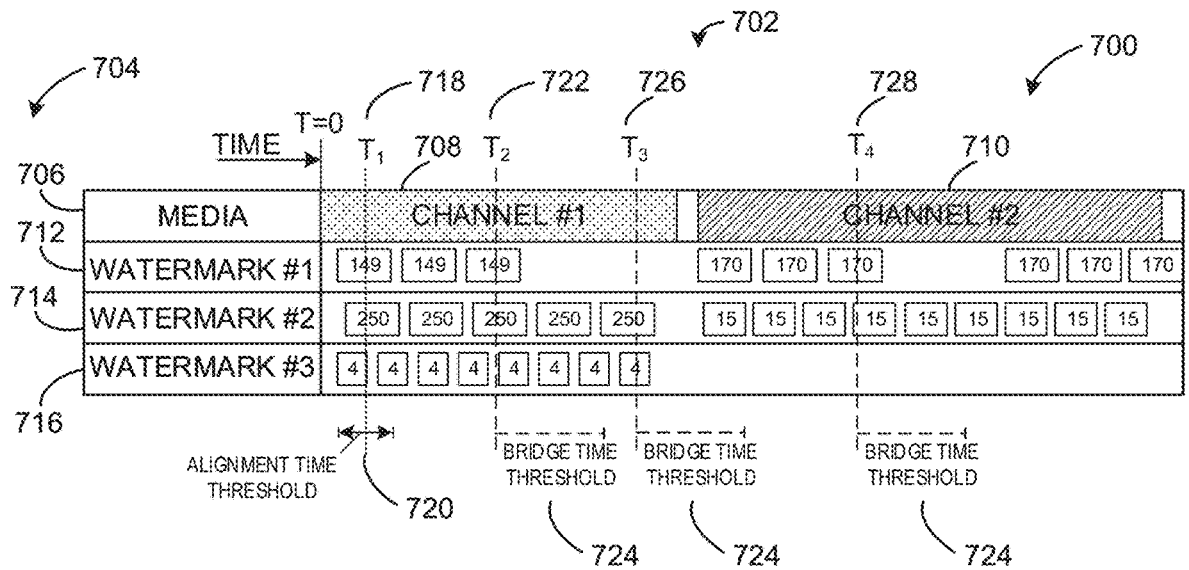
FIG. 7A
FIG. 7B
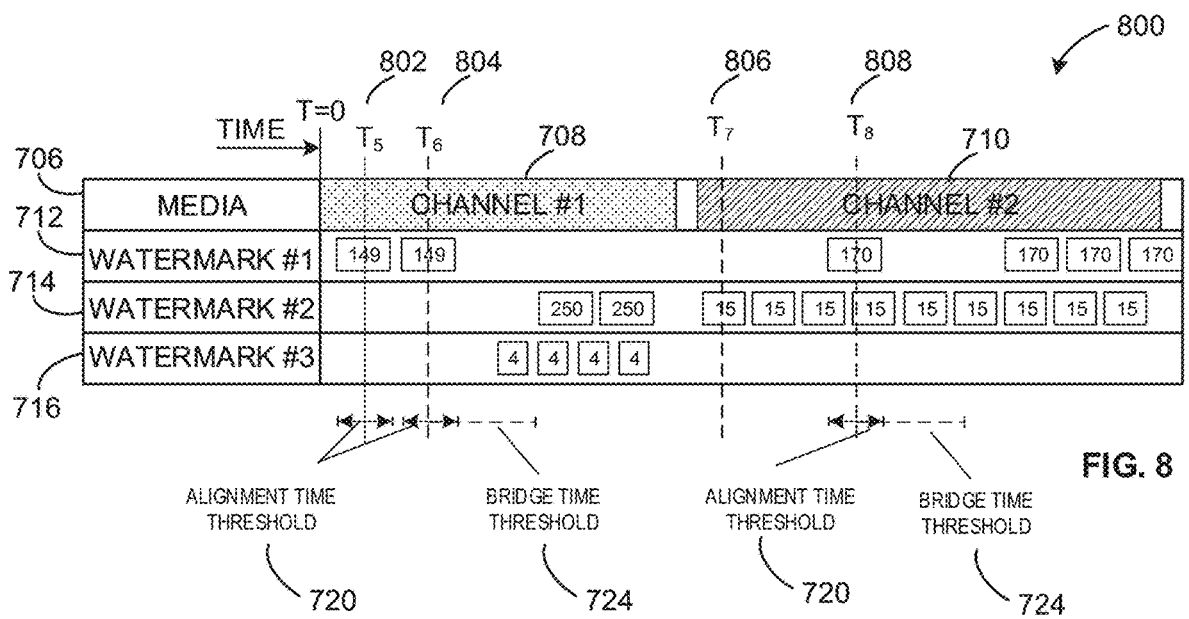
FIG. 8

… (1)

APPARATUS AND METHODS TO ASSOCIATE DIFFERENT WATERMARKS DETECTED IN MEDIA

CROSS-REFERENCE TO RELATED APPLICATIONS

This patent is a continuation of U.S. patent application Ser. No. 17/833,703, filed on Jun. 6, 2022, which is a continuation of U.S. patent application Ser. No. 16/231,060, (now U.S. Pat. No. 11,356,747), filed on Dec. 21, 2018, entitled "APPARATUS AND METHODS TO ASSOCIATE DIFFERENT WATERMARKS DETECTED IN MEDIA". Priority to U.S. patent application Ser. Nos. 16/231,060 and 17/833,703 is hereby claimed. U.S. patent application Ser. Nos. 16/231,060 and 17/833,703 are hereby incorporated herein in their entirety.

FIELD OF THE DISCLOSURE

This disclosure relates generally to media monitoring, and, more particularly, to apparatus and methods to associate different watermarks detected in media.

BACKGROUND

Media, such as a television broadcast, may be encoded with watermarks that, when detected, are decoded to identify the media that was presented.

BRIEF DESCRIPTION OF THE DRAWINGS

FIG. 7A is a first schematic depicting example media presentations and corresponding watermarks decoded during the media presentations.

FIG. 7B is a watermark data structure represented as a table of watermarks and corresponding to identification information associated with the media presentation sessions represented in FIG. 7A.

FIG. 8 is a second schematic depicting the example media presentations of FIG. 7A, but with alternate watermarks decoded during the media presentations.

The figures are not to scale. In general, the same reference numbers will be used throughout the drawing(s) and accompanying written description to refer to the same or like parts.

DETAILED DESCRIPTION

Figure 1:
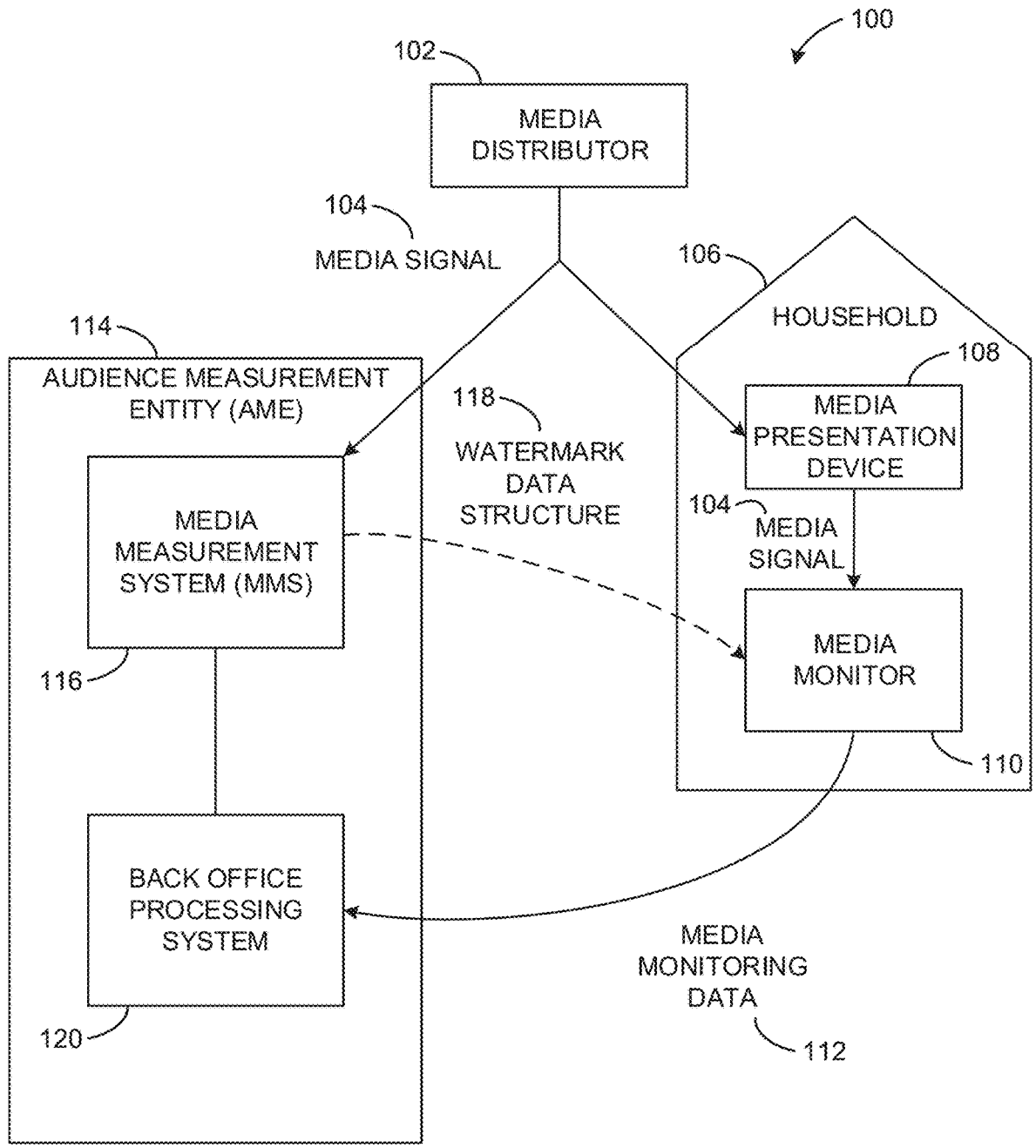
FIG. 1 is a block diagram of an example environment for associating different watermarks detected in media in accordance with the teachings of this disclosure.

Audience measurement entities desire knowledge on how users interact with media devices such as smartphones, tablets, laptops, smart televisions, etc. In particular, media monitoring companies want to monitor media presentations made at the media devices to, among other things, monitor exposure to advertisements, determine advertisement effectiveness, determine user behavior, identify purchasing behavior associated with various demographics, etc.

Watermarking is a technique used to identify media such as television broadcasts, radio broadcasts, advertisements (television and/or radio), downloaded media, streaming media, prepackaged media, etc. Existing watermarking techniques identify media by embedding one or more codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Audience measurement entities utilize watermarks to identify media. For example, one or more watermark decoder(s) at an audience measurement entity and/or one or more watermark decoder(s) of a media monitor can monitor media signals (e.g., received from a broadcast) to identify media that is being presented. A watermark decoder may be configured to detect and subsequently decode specific types of watermarks (e.g., watermark types utilized by the audience measurement entity, by a broadcaster, by a media provider, etc.). Therefore, a media monitor may include a plurality of different watermark decoders to decode respective watermark types. The watermark(s) that are detected and decoded correspond to a known type of watermark that is encoded by the audience measurement entity, media distributor, and/or other entity. The one or more watermarks encoded in the media signals can be detected in the media signals when the media signals are processed by a media monitor (e.g., based on microphone pickup of the media signals, wired pickup of the media signals, or another wireless pickup technique).

Watermarks are often encoded at regular intervals (e.g., every five seconds). A watermark decoder can thus determine an identified media presentation is still ongoing based on the presence of watermarks at the regular intervals. Some audience measurement entities may utilize a threshold time period to determine, with sufficient confidence, that a media presentation has concluded. A watermark decoder may be configured with a time-based threshold (e.g., fifty-seven seconds) within which a matching watermark (matching a previously detected watermark) must be detected to identify a media presentation as ongoing. For example, utilizing a fifty-seven second threshold, if a watermark is detected and decoded and then no matching watermark is decoded within the fifty-seven seconds, the watermark decoder determines that the media presentation corresponding to the previously detected watermark ended at the time of the previously detected watermark.

As watermarks are typically encoded in a manner that intentionally evades human perception (e.g., based on psychoacoustic limits and utilizing low amplitude sine waves), watermarks can have low signal strength (e.g., signal to noise ratio) and can therefore be difficult to decode. For example, in some sections of a media presentation, the audio characteristics of the media signal may reduce an overall signal to noise ratio associated with the watermark, preventing the watermark decoder from detecting and decoding the watermark with confidence.

When an audience measurement entity utilizes a threshold time period to determine a media presentation is ongoing, this threshold time period can be configured to represent an expected maximum gap between decodable watermarks (e.g., as determined empirically). However, the threshold cannot be extended too long, or else the audience measurement entity will be uncertain whether consecutive detected watermarks that are nearing the threshold time period represent one continuous presentation or perhaps an occurrence of a separate presentation (e.g., where a different presentation occurred in between, or no presentation occurred in between). Therefore, utilizing conventional techniques focused on decoding one type of watermark for media identification, an audience measurement entity may have difficulty reliably identifying media presentations when watermark signal strength (e.g., signal-to-noise ratio) is reduced.

Media signals can include more than one type of watermark. An audience measurement entity may coordinate with a media provider (e.g., a content creator) to embed a first type of watermark into the media signal. A media distributor and/or other media entity may additionally embed a second type of watermark into the media signal. The audience measurement entity and/or media monitor, when detecting and decoding watermarks in the media signal, may be able to detect and, in some examples, decode the second type watermark. However, the second type of watermark may not decode to the same identifier as the first type of watermark. For example, each of the first and second types of watermarks, despite representing the same media presentation, may correspond to different codes which are to be separately compared to separate reference databases specific to their respective watermark types. The first and second watermark types may be decoded using separate decoding techniques. Conventionally, a watermark decoder is configured to work with one type of watermark, while not utilizing other types of watermarks that may be present in media signals. Thus, media monitoring devices (e.g., media monitors) may include a plurality of watermark decoders corresponding to different types of watermarks embedded in the media signals. However, each watermark decoder may utilize an independent crediting chain, whereby watermarks of a first type create a first type of media presentation record, and watermarks of a second type create a second type of media presentation record, despite potentially representing the same media presentation.

Example methods, apparatus, systems and articles of manufacture (e.g., physical storage media) for associating different watermarks detected in media are disclosed herein. Example disclosed media measurement techniques utilize a plurality of watermarks of one or more types that are present in a media signal to identify one or more characteristics (e.g., a program name, a channel name, a station identifier, etc.) of the media conveyed by the media signal. In some examples, a watermark data structure is accessed that identifies watermarks of different types that correspond to the same media presentation. In some such examples, a media monitor accesses such a data structure that is generated by an audience measurement entity. For example, the audience measurement entity may generate the watermark data structure by observing media signals from a media measurement system (MMS), which serves as a monitoring location where a plurality of media signals can be observed and analyzed. In some such examples, the MMS detects and decodes watermarks in the media signals and associates watermarks that correspond to the same media presentation by indicating this correspondence in the watermark data structure. In some examples, the MMS utilizes metadata conveyed with the media signals (e.g., identification metadata) to associate different watermarks detected in the media signals.

In some example techniques disclosed herein, a media monitor or other media measurement apparatus utilizes an association technique to identify watermarks of different types that correspond to the same media presentation as the watermarks are detected. In some example association techniques described herein, by observing watermarks that are encoded within an alignment time threshold of each other, watermarks can be determined to correspond to the same media. For example, if a first watermark is observed at a regular interval (e.g., every four seconds), and a second watermark of a different type regularly occurs within a short period (e.g., the alignment time threshold) relative to the first watermark type, the first and second watermarks can be assumed to identify the same media. While conventional techniques typically focus on utilization of one type of watermark to generate media presentation records, techniques disclosed herein associate watermarks that are observed substantially simultaneously (e.g., within the alignment time threshold) such that multiple types of watermarks can be utilized to identify the media presentation as it persists, or when the same media presentation (e.g., having a same identifier, such as a channel identification) occurs again in the future. Some such example techniques disclosed herein utilize these associations to generate the watermark data structure.

Example media measurement techniques disclosed herein enhance the ability of a media monitor or other media measurement apparatus to generate precise media presentation records. For example, if a main watermark that is used to generate media presentation records has low signal strength during a portion of a media presentation, the media monitor can utilize (e.g., via the watermark data structure, via association, etc.) other watermarks that are detected in the signal to determine whether the media presentation is still ongoing. In some examples, by leveraging a plurality of watermark types that are frequently present in media signals, example techniques disclosed herein enable precise determination of when a media presentation concludes. Further, by leveraging the plurality of watermark types, example techniques disclosed herein can maintain continuity of an ongoing media presentation record based on a plurality of watermark types when a main type of watermark has low signal strength or is not observed.

These and other techniques, methods, apparatus, systems and articles of manufacture to associate different watermarks detected in media are disclosed in greater detail below.

FIG. 1 is a block diagram of an example environment 100 for associating different watermarks detected in media in accordance with the teachings of this disclosure. The example environment 100 includes an example media distributor 102, an example media signal 104, an example household 106, an example media presentation device 108, an example media monitor 110, example media monitoring data 112, an example audience measurement entity (AME) 114, an example media measurement system (MMS) 116, an example watermark data structure 118 and an example back office processing system 120.

The media distributor 102 of the illustrated example of FIG. 1 is an entity for communicating media signals to a broad audience. For example, the media distributor 102 can receive a plurality of different media signals conveying media and utilize transmission technology (e.g., via antennas, via satellites, via cable, via the internet, etc.) to make the media signals available to a large audience. In some examples, the media distributor 102 utilizes a watermark encoder to embed symbols representative of identifying information into the media signals prior to communicating the media signal(s). In some examples, the media signal(s) already include embedded watermarks when they are received at the media distributor 102 (e.g., having been previously encoded by a content creator, by a media monitoring entity, by another media distributor, etc.).

The media signal 104 of the illustrated example of FIG. 1 is a signal conveying media that is intended for distribution to an audience. The media signal 104 is transmitted generally to a broad audience, whereby the MMS 116 the media presentation device 108, and ultimately the media monitor 110 are able to receive the media signal 104. The media signal 104 can be an audio signal conveying media (e.g., a radio broadcast, a podcast, etc.), an audiovisual signal conveying media (e.g., a television show, a movie, a commercial, etc.) or any other signal conveying media. For example, the media signal 104 can be a broadcast signal, a multicast signal, a unicast signal, a streaming signal, and/or any type of media signal. In some examples, a media signal is transmitted to the media distributor 102 by a content creator, a content distributor, or another entity and is then distributed as the media signal 104. The media signal 104 of the illustrated example includes one or more watermarks of one or more watermark types. The media signal 104 can be conveyed wirelessly (e.g., via a network, via antennae, via Wi-Fi, etc.) or via a direct physical connection (e.g., cable, Ethernet etc.). In some examples, the media signal 104 is transmitted to the household 106, but not to the AME 114. The media signal 104 of the illustrated example is presented by the media presentation device 108 and received by the media monitor 110. In some examples, the media signal 104 includes additional noise (e.g., reduced signal quality) after it is reproduced by the media presentation device 108). The media signal 104 may be received by the media monitor 110 via a connection to a media presentation device (e.g., the media presentation device 108 of FIG. 1), via a microphone, etc.

The household 106 of the illustrated example of FIG. 1 is a household including the media presentation device 108 and the media monitor 110. The household 106 represents any location at which media is presented and monitored, and does not necessarily need to be a household or residence (e.g., the household 106 may be a workplace, a vehicle, a public setting, etc.).

The media presentation device 108 of the illustrated example of FIG. 1 is a device that accesses the media signal 104 for presentation. In some examples, the media presentation device 108 is capable of directly presenting media (e.g., via a display), while in other examples, the media presentation device 108 presents the media on separate media presentation equipment (e.g., speakers, a display, etc.). Thus, as used herein, a "media presentation device" may or may not be able to present media without assistance from a second device. Media presentation devices are typically consumer electronics. For example, the media presentation device 108 of the illustrated example may be a television, which is capable of directly presenting media (e.g., via an integrated and/or connected display and speakers). In some examples, the media presentation device is a tablet, a smartphone, a desktop computer, a laptop computer, and/or any other type of media presentation device. The household 106 may include any type and/or number of media device(s) that access the media signal 104. In some examples, the media presentation device 108 is connected (e.g., via a wireless connection and/or a wired connection) with the media monitor 110.

The media monitor 110 of the illustrated example of FIG. 1 executes media measurement tasks. In some examples, the media monitor 110 processes audio of the media signal 104 presented by the media presentation device 108 (e.g., via a microphone). In some such examples, the media monitor 110 is a standalone device separate from the media presentation device. For example, the media monitor 110 may be wirelessly connected to the media presentation device 108 and/or removably connected (e.g., via connections such as HDMI, USB, Ethernet, or other connections) to the media presentation device 108. In some examples, the media monitor 110 includes a microphone to pick up the media signal 104 and/or any other media signals presented in the vicinity of the media monitor 110. In some examples, the media monitor 110 is installed in (e.g., integral to) the media presentation device 108. For example, the media monitor 110 may include one or more hardware and/or software components embedded in the media presentation device 108.

The media monitor 110 of the illustrated example may receive the watermark data structure 118 from the MMS 116, or from another component of the AME 114 and utilize the watermark data structure 118 to associate watermarks of different watermark types having identifiers corresponding to same media presentations (e.g., a channel, a program name, etc.).

In some examples, the media monitor 110 does not receive the watermark data structure 118, but instead utilizes a matching and/or association technique to associate different watermarks detected in media. The media monitor 110 of the illustrated example generates media monitoring data 112 and transmits the media monitor data 112 to the AME 114 (e.g., the back office processing system 120 of the AME 114). Further detail of the structure of the media monitor 110 and the techniques performed by the media monitor 110 is described in connection with FIG. 2.

The media monitoring data 112 of the illustrated example of FIG. 1 is data corresponding to media processed by the media monitor 110. The media monitoring data 112 may include one or more media presentation records communicating media presented via a media presentation device (e.g., the media presentation device 108). In some examples, the media monitoring data 112 includes identification information, such as a station name, a program name, a program genre, etc. The media monitoring data 112 of the illustrated example includes start and end times associated with media presentation records. The media presentation records can start when the media presentation device 108 transitions to an "on" state and/or when a new media presentation is encountered (e.g., as determined by decoding watermarks and/or utilizing other identification techniques). The media presentation records can conclude when the media presentation device 108 transitions to an "off" state and/or when a media presentation ends (e.g., based on encountering a new media presentation, based on a duration since a previous identifier exceeding a threshold, etc.). In some examples, the media monitor 110 transmits media monitoring data 112 that is unprocessed to the back office processing system 120, where further analysis is performed. For example, the media monitoring data 112 can include recorded portions of the media signal 104.

The AME 114 of the illustrated example of FIG. 1 is an entity responsible for collecting media monitoring information. The AME 114 collects media monitoring data such as the media monitoring data 112 from a plurality of monitors to determine, among other things, media consumption habits, advertising exposure, audience size, etc. The AME 114 includes the MMS 116 and the back office processing system 120. In the illustrated example, the MMS 116 and the back office processing system 120 are separate locations, each operated and/or utilized by the AME 114. In some examples, the MMS 116 and the back office processing system 120 are at a common location and/or share common components.

The MMS 116 of the illustrated example of FIG. 1 is a location that observes and/or collects data regarding media signals. The MMS 16 may include one or more receivers (e.g., set top boxes) to access media from the media distributor 102. The MMS 116 of the illustrated example generates the watermark data structure 118 based on watermarks observed in broadcast signals (e.g., the media signal 104). In some examples, the MMS 116 accesses metadata associated with the broadcast signals, and associates all watermarks detected during the time period of a media presentation (e.g., as indicated by the metadata) in the watermark data structure. In some examples, one or more people can manually associate watermarks that are observed at the same time at the MMS 116 and add them to the watermark data structure 118. In some examples, the association techniques utilized by the media monitor 110 to generate watermark data structures can be employed on a larger scale at the MMS 116 to generate watermark data structures as media presentations occur. The MMS 116 can transmit the watermark data structure 118 to the media monitor 110 when it is requested by the media monitor 110, at a regular interval, and/or at any other time.

The watermark data structure 118 of the illustrated example of FIG. 1 is used by the media monitor 110 to determine whether one or more watermark(s) detected in the media signal 104 correspond to other watermarks, and thus, correspond to a same media presentation record. The watermark data structure 118 is a data structure that holds information about watermarks. The watermark data structure 118 may be a look-up table, a matrix, and/or any data storage solution to store information pertaining to corresponding watermarks. The watermark data structure 118 may include, for example, watermark codes in a same row or column that correspond to a same media presentation. Thus, if a watermark code is received that is not of a watermark type being currently used to establish and modify media presentation records, the watermark data structure 118 can be queried to potentially associate the watermark code with one or more watermark codes that are currently in use for media presentation records. In some examples, the watermark data structure 118 is generated at the MMS 116 and communicated to the media monitor 110. In some examples, the watermark data structure 118 is generated at the media monitor 110 as watermarks are detected.

The back office processing system 120 of the illustrated example of FIG. 1 is a facility of the AME 114 that processes media monitoring data. The back office processing system 120 of the illustrated example collects media monitoring data from a plurality of media monitors at a plurality of locations. The back office processing system 120 can additionally or alternatively access and/or analyze media monitoring data from the MMS 116. In some examples, watermark association may be performed at the back office processing system 120 as opposed to at the media monitor 110. For example, the media monitor 110 may transmit the media monitoring data 112 as raw data (e.g., microphone data) and/or partially processed data (e.g., watermark-specific data, extracted watermark codes, etc.) to the back office processing system 120, which may then reference one or more watermark data structures to identify media presentations and generate media presentation records.

In operation, the media distributor 102 communicates the media signal 104 to the household 106, where it is received and presented by the media presentation device 108. The media monitor 110 processes the media presentation and generates media monitoring data 112 based on watermarks observed in the media signal 104. The AME 114 additionally receives the media signal 104 at the MMS 116, which can generate and transmit the watermark data structure 118 for use by the media monitor 110 when generating the media monitoring data 112. The back office processing system 120 accesses the media monitoring data 112 to generate aggregate media monitoring data.

Figure 2:
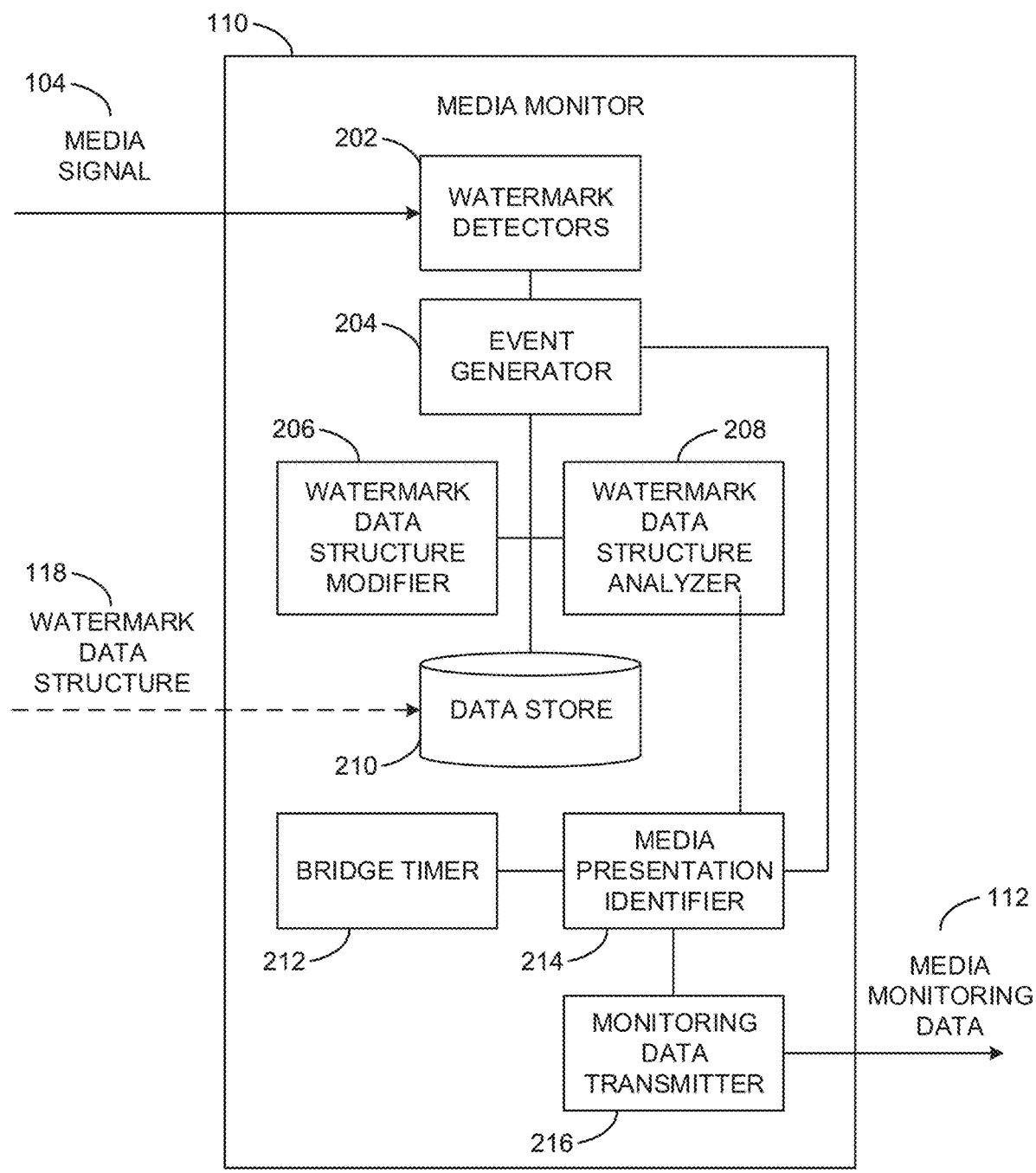
FIG. 2 is a block diagram of an example media monitor to measure media constructed in accordance with the teachings of this disclosure.

FIG. 2 is a block diagram of an example implementation of the media monitor 110 of FIG. 1 for associating different watermarks detected in media constructed in accordance with the teachings of this disclosure. The media monitor 110 receives the media signal 104 and may receive the watermark data structure 118. The media monitor 110 outputs the media monitoring data 112. The media monitor 110 includes example watermark detectors 202, an example event generator 204, an example watermark data structure modifier 206, an example watermark data structure analyzer 208, an example data store 210, an example bridge timer 212, an example media presentation identifier 214, and an example monitoring data transmitter 216.

The watermark detectors 202 of the illustrated example of FIG. 2 include one or more detectors to detect and/or decodes watermarks embedded in the media signal 104. In some examples, to detect and/or decode watermarks in the media signal 104, the watermark detectors 202 can convert the media signal 104 into a format enabling identification of watermark components (e.g., tones). For example, the watermark detectors 202 can convert the media signal 104 into a fast Fourier transform (FFT) representation, a discrete Fourier transform (DFT) representation, and/or any other frequency domain representation of the media signal 104. In some examples, the watermark detectors 202 identify watermark components based on boosted (e.g., amplified) amplitude values of specific frequency ranges of the media signal 104. In some examples, the watermark detectors 202 detect watermark symbols and are able to decode the watermark symbols.

The event generator 204 of the illustrated example of FIG. 2 sorts and/or aggregates watermarks as they are detected by the watermark detectors 202. The event generator 204 of the illustrated example additionally or alternatively determines a master watermark type of the watermark types detected by the watermark detectors 202. The event generator 204 communicates watermarks of the master watermark type to the media presentation identifier 214 to be used directly in establishing, modifying, and/or concluding media presentation records. Further, the event generator 204 communicates watermarks that are not of the master watermark type (e.g., not used to directly modify media presentation records) to the watermark data structure analyzer 208 to determine whether the watermarks are associated with master watermarks in the watermark data structure 118. As used herein, the term "master watermark" refers to a watermark which is utilized as a primary watermark for creation of media presentation records. The event generator 204 can alter which watermark type is used as the master watermark type based on ones of the watermark detectors 202 that are available, as well as the types of watermarks being detected in the media signal 104. In some examples, all watermarks detected by the watermark detectors 202 are processed through the event generator 204. In some such examples, the event generator 204 sorts the watermarks by watermark type and then communicates them to the appropriate components of the media monitor (e.g., to the watermark data structure modifier 206, the watermark data structure analyzer 208, and/or the media presentation identifier 214).

The watermark data structure modifier 206 of the illustrated example of FIG. 2 modifies the watermark data structure 118 based on watermarks detected by the watermark detectors 202. For example, in response to one of the watermark detectors 202 decoding a watermark and the watermark data structure analyzer 208 determining that the watermark is not represented in the watermark data structure (e.g., is not associated with a master watermark), the watermark detectors 202 can determine whether the watermark satisfies one or more conditions (e.g., the alignment time threshold, the signal strength threshold, etc.) to be added to the watermark data structure. If the watermark is not already represented in the watermark data structure and satisfies these conditions, the watermark data structure modifier 206 of the illustrated example adds the watermark to the data structure in association with the other watermark that was detected with the watermark. In some examples, the watermark data structure modifier 206 adds watermarks to a same row or column of the watermark data structure for watermarks that correspond to the same media presentation. The watermark data structure modifier 206 can add the watermark to the watermark data structure in any other way that enables the watermark data structure analyzer 208 to determine that subsequent occurrences of the same watermark should be associated with the same master watermark.

In some examples, the watermark data structure modifier 206 of the illustrated example determines whether watermarks detected in the media signal 104 are within an alignment time threshold of a master watermark. For example, if a first watermark is detected a within one second of a second watermark, and the alignment time threshold is configured to be two seconds, the watermark data structure modifier 206 determines that the first watermark was within the alignment time threshold. A watermark being within the alignment time threshold of another can be one indicator that the watermarks correspond to the same media presentation. In some examples, the data structure modifier 206 determines whether a plurality of first and second watermarks are detected respectively within the alignment time threshold. For example, in order to determine that a first watermark corresponds to the same media presentation as a second watermark, the watermark data structure modifier 206 may be configured with a minimum matching occurrence threshold designating a number of the first watermarks that must be observed within the alignment time threshold of second watermarks. For example, if the matching occurrence threshold is set to three, then three of the first watermark must be observed within the alignment time threshold of one or more instances of the second watermark to satisfy the matching occurrence threshold.

Further, in some examples, the watermark data structure modifier 206 determines whether watermarks that are not yet represented in the watermark data structure 118 satisfy a signal strength threshold to be associated in the watermark data structure 118. In some examples, the watermark data structure modifier 206 additionally determines whether the signal strength of the watermark that is represented within the watermark data structure 118 satisfies the signal strength threshold to be utilized to associate the watermarks within an alignment time threshold of this watermark. For example, if a first watermark not represented in the watermark data structure 118, and it is observed within the alignment time threshold of a second watermark that is in the watermark data structure, the watermark data structure modifier 206 may determine whether the second watermark satisfies the signal strength threshold in addition to the first watermark satisfying the signal strength threshold. The signal strength threshold can be configured to be a specific signal-to-noise ratio (SNR) or other value representing the strength of the watermark signal.

Thus, the watermark data structure modifier 206 of the illustrated example determines if any one or more of the following conditions are satisfied before associating a first watermark with a second watermark in the watermark data structure: (1) the first is within an alignment time threshold of the second watermark, (2) a sufficient quantity of ones of the first watermark have been observed within the alignment time threshold of ones of the second watermark to satisfy a minimum matching occurrence threshold, (3) the first watermark satisfies a signal strength threshold, and/or (4) both the first watermark and the second watermark satisfy the signal strength threshold.

In some examples, the watermark data structure modifier 206 creates the watermark data structure 118, as opposed to the media monitor 110 receiving the watermark data structure 118 and then modifying it. For example, if no watermark data structure is received or already exists, the watermark data structure modifier 206 can create the watermark data structure 118. In some examples, the watermark data structure 118 is communicated from the media monitor to the AME 114 for use in an aggregate watermark data structure that can be pushed (e.g., communicated) to a plurality of other monitors, thus leveraging information from the monitors to create a crowd-sourced watermark data structure.

The watermark data structure analyzer 208 of the illustrated example of FIG. 2 determines whether a watermark detected by one of the watermark detectors 202 is in the watermark data structure. In some examples, the watermark data structure analyzer 208 receives a plurality of watermarks that are determined by the event generator 204 not to be master watermarks, and the watermark data structure analyzer 208 determines whether the non-master watermarks are represented in the watermark data structure. Further, in some examples, the watermark data structure analyzer 208 of the illustrated example may determine whether non-master watermarks are associated with a master watermark associated with a current media presentation record processed by the media presentation identifier 214. For example, if the event generator 204 has designated a first type of watermark as a master watermark and forwarded detected watermarks of the first type to the media presentation identifier 214, the watermark data structure analyzer 208 can analyze other detected watermarks (e.g., not of the first type) to determine whether the other watermarks are associated with the same media presentations as the watermarks detected of the first type. The watermark data structure analyzer 208 can search the watermark data structure for a code (e.g., a number) associated with the detected watermark to determine if the code is in the watermark data structure. In response to the detected watermark being found in the watermark data structure in association with a master watermark being utilized for media presentation records by the media presentation identifier 214, the watermark data structure analyzer 208 communicates information indicating that the watermark is associated with the matching master watermark to the media presentation identifier 214. In some examples, in response to the detected watermark being found in the watermark data structure, the watermark data structure analyzer 208 determines identification information (e.g., a station name, a program name, etc.) based on one or more watermarks associated with the detected watermark. In response to matching the detected watermark with another watermark in the watermark data structure, the watermark data structure analyzer 208 associates the detected watermark with the matching watermark from the watermark data structure.

In some examples, in response to finding the detected watermark in the watermark data structure, the watermark data structure analyzer 208 performs a data operation to indicate that the detected watermark is equivalent to its corresponding master watermark from the watermark data structure. For example, the watermark data structure analyzer 208 may transform the detected watermark to an instance of the master watermark, which may be more easily utilized by the media presentation identifier 214 and/or subsequently by the AME 114 for measuring media. In response to the detected watermark not being present in the watermark data structure 118, the watermark data structure modifier 206 can initiate analyses to determine whether the detected watermark can be added to the watermark data structure.

In some examples, the watermark data structure analyzer 208 may additionally or alternatively query the MMS 116 to determine whether a watermark is included in a watermark data structure. In some such examples, one or more watermark data structure(s) are maintained at the MMS 116 and the association of non-master watermarks with master watermarks is performed at the MMS 116 in response to the query received from the media monitor 110.

The data store 210 of the illustrated example of FIG. 2 is a storage location for watermark data structures and/or media monitoring data. The data store 210 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The data store 210 may additionally or alternatively be implemented by one or more double data rate (DDR) memories, such as DDR, DDR2, DDR3, mobile DDR (mDDR), etc. The data store 210 may additionally or alternatively be implemented by one or more mass storage devices such as hard disk drive(s), compact disk drive(s) digital versatile disk drive(s), etc. While in the illustrated example the data store 210 is illustrated as a single database, the data store 210 may be implemented by any number and/or type(s) of databases. Furthermore, the data stored in the data store 210 may be in any data format such as, for example, binary data, comma delimited data, tab delimited data, structured query language (SQL) structures, etc.

The bridge timer 212 is a timer to track a duration since a previous watermark corresponding to a media presentation. In some examples, the bridge timer 212 is configured with a bridge time threshold. The bridge time threshold represents a maximum duration between matching watermarks within which the matching watermarks are considered to correspond to the same media presentation record. For example, if the bridge time threshold is set to 45 seconds, and a first watermark is decoded and identified, a subsequent watermark corresponding to the same media presentation record (e.g., decoding to the same media identification information, corresponding to an associated watermark in the watermark data structure, etc.) as the first watermark must be identified within 45 seconds to be considered part of the same media presentation record. In some examples, the bridge timer 212 resets each time a new watermark is encountered. In some examples, the bridge timer 212 resets if either (a) a new watermark corresponding to a current media presentation record is detected or (b) a new watermark corresponding to a different (e.g., new) media presentation record is detected. In some examples, the bridge timer 212 is implemented as a standard count-up timer and does not reset with new watermark detections. In some such examples, the media presentation identifier 214 can utilize times from the bridge timer 212 to calculate elapsed times since prior detected watermarks and thereby conclude media presentations records when appropriate (e.g., in response to the elapsed times exceeding the bridge time threshold).

The media presentation identifier 214 of the illustrated example of FIG. 2 generates and modifies media presentation records. The media presentation identifier 214 accesses identification information that may be directly determined from a watermark and establishes new media presentation records, modifies current media presentation records, or concludes current media presentation records as appropriate. The media presentation identifier 214 accesses master watermarks from the event generator 204 and generates media presentation records based on the master watermarks. Thus, the master watermarks communicated by the event generator 204 can be utilized to directly establish or modify media presentation records.

The media presentation identifier 214 of the illustrated example additionally utilizes non-master watermarks to uphold the media presentation record based on watermarks that are determined to be associated with the master watermarks (e.g., as determined by the watermark data structure analyzer 208). In some examples, the master watermark type which is utilized directly as a main watermark type for a media presentation record may be changed by the event generator 204. For example, if event generator 204 determines that a different watermark type is more consistent and/or prevalent, it may designate this different watermark type as the new master watermark to be utilized to directly modify the media presentation records.

In some examples, when the media presentation identifier 214 does not currently have an open (e.g., ongoing) media presentation record, the media presentation identifier 214 can open a new media presentation record in response to the event generator 204 communicating a master watermark to the media presentation identifier 214. In some such examples, subsequently, if an additional watermark is detected and/or decoded corresponding to the same identification information (e.g., either a master watermark communicated from the event generator or a non-master watermark matched with the master watermark by the watermark data structure analyzer 208), the media presentation identifier 214 extends the media presentation record and/or indicates that the bridge timer 212 should be reset. However, if an additional watermark is detected corresponding to different identification information (e.g., a new media presentation), the prior media presentation record is ended with an end time corresponding to the last detected watermark, and a new media presentation record beginning at the newly detected watermark is established. The media presentation identifier 214 can access communications from the bridge timer 212 indicating that the bridge time threshold has been exceeded. In response to the bridge time threshold being exceeded, the media presentation identifier 214 concludes the prior media presentation record with an end time corresponding to the last detected watermark. The media presentation records generated by the media presentation identifier 214 include start times, end times, and/or durations along with identification information associated with media presentation sessions. The media presentation identifier 214 communicates media presentation records to the monitoring data transmitter 216.

The monitoring data transmitter 216 of the illustrated example of FIG. 2 transmits media monitoring data to the AME 114. Specifically, the monitoring data transmitter 216 of the illustrated example can transmit the media monitoring data to the back office processing system 120. The media monitoring data can include one or more media presentation records generated by the media presentation identifier 214. In some examples, the monitoring data transmitter 216 transmits the media monitoring data 112 to the back office processing system 120 at a regular interval. In some examples, the monitoring data transmitter 216 transmits the media monitoring data 112 in response to a request from a component of the AME 114.

In operation, the media signal 104 is processed by the watermark detectors 202, which decode watermarks present in the media signal 104. The event generator 204 then aggregates the watermarks detected by the watermark detectors 202 and selects a master watermark type. The event generator 204 then communicates watermarks of the master watermark type to the media presentation identifier 214 and communicates watermarks not of the master watermark type to the watermark data structure analyzer 208. The watermark data structure modifier 206 updates a watermark data structure if the watermark is not yet in the watermark data structure 118 and meets several criteria to be associated with another one of the watermarks. The watermark data structure analyzer 208 is utilized to determine whether ones of the detected watermarks correspond to other watermarks in the watermark data structure 118, which is stored in the data store 210. In some examples, in response to ones of the non-master watermarks being determined to be in represented in the watermark data structure as corresponding to a master watermark, this information is communicated to the media presentation identifier 214. The bridge timer 212 tracks elapsed times since prior detected watermarks to enable the media presentation identifier 214 to accurately determine start and end times of presentations and generate media presentation records. The media presentation identifier 214 generates the media presentation records based on master watermarks from the event generator 204 and/or non-master watermarks associated with master watermarks, as determined by the watermark data structure analyzer 208. Media presentation records are then included in media monitoring data that is transmitted by the monitoring data transmitter 216 to the AME 114.

While an example manner of implementing the media monitor 110 of FIG. 1 is illustrated in FIG. 2, one or more of the elements, processes and/or devices illustrated in FIG. 2 may be combined, divided, re-arranged, omitted, eliminated and/or implemented in any other way. Further, the example watermark detectors 202, the example event generator 204, the example watermark data structure modifier 206, the example watermark data structure analyzer 208, the example data store 210, the example bridge timer 212, the example media presentation identifier 214, the example monitoring data transmitter 216 and/or, more generally, the example media monitor 110 of FIG. 2 may be implemented by hardware, software, firmware and/or any combination of hardware, software and/or firmware. Thus, for example, any of the example watermark detectors 202, the example event generator 204, the example watermark data structure modifier 206, the example watermark data structure analyzer 208, the example data store 210, the example bridge timer 212, the example media presentation identifier 214, the example monitoring data transmitter 216 and/or, more generally, the example media monitor 110 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, watermark detectors 202, the example event generator 204, the example watermark data structure modifier 206, the example watermark data structure analyzer 208, the example data store 210, the example bridge timer 212, the example media presentation identifier 214, the example monitoring data transmitter 216 and/or, more generally, the example media monitor 110 of FIG. 2 is/are hereby expressly defined to include a nontransitory computer readable storage device or storage disk such as a memory, a digital versatile disk (DVD), a compact disk (CD), a Blu-ray disk, etc. including the software and/or firmware. Further still, the example media monitor 110 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
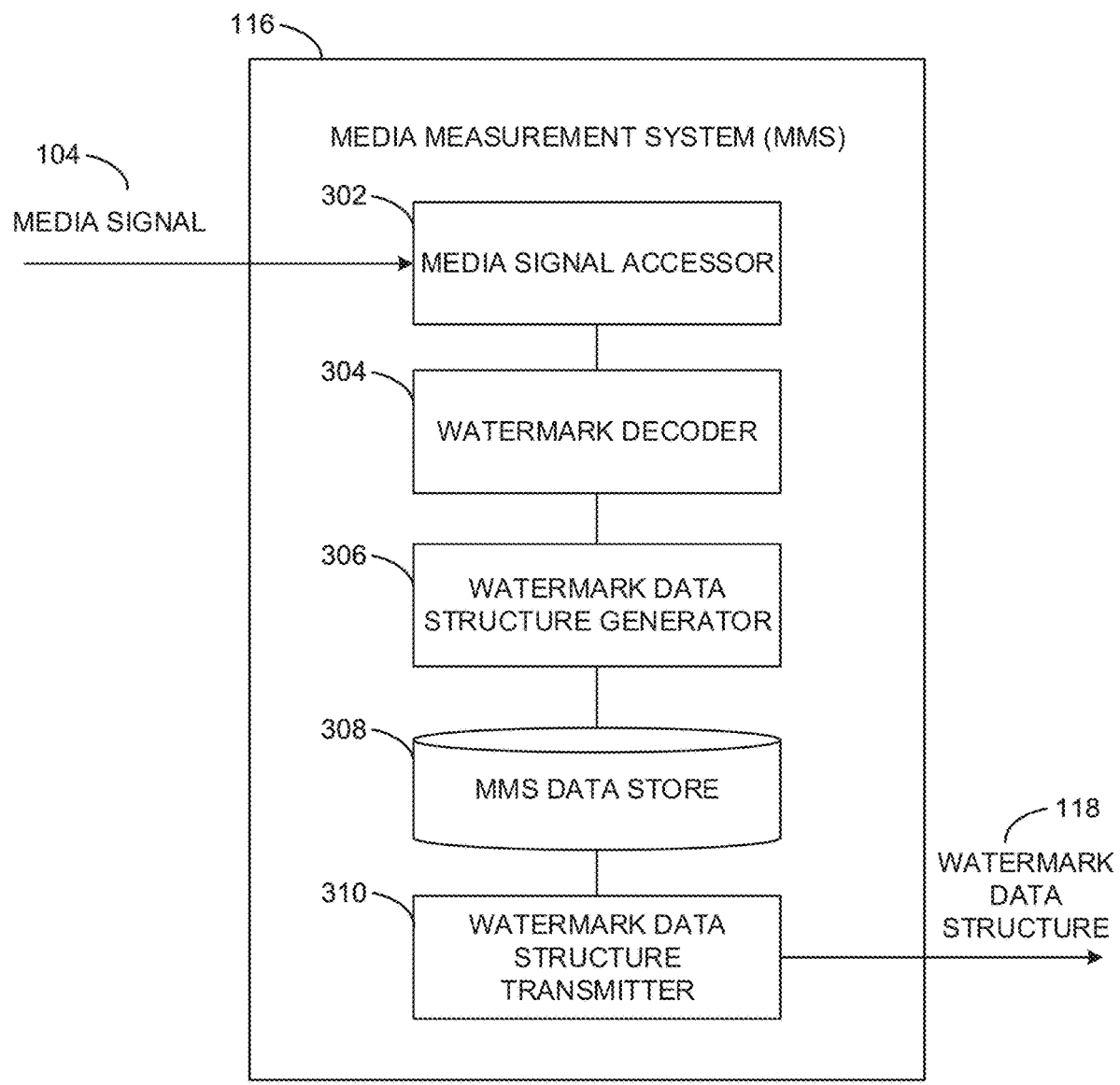
FIG. 3 is a block diagram of an example media measurement system (MMS) to generate watermark data structures in accordance with the teachings of this disclosure.

FIG. 3 is a block diagram of an example implementation of the MMS 116 of FIG. 1 for watermark data structure generation constructed in accordance with the teachings of this disclosure. The MMS 116 receives the media signal 104 and outputs the watermark data structure 118. The MMS 116 includes an example media signal accessor 302, an example watermark decoder 304, an example watermark data structure generator 306, an example MMS data store 308, and an example watermark data structure transmitter 310.

The example media signal accessor 302 of the illustrated example of FIG. 3 accesses the media signal 104. The media signal accessor 302 may access a plurality of media signals available at a location of the MMS 116. The media signal accessor 302 of the illustrated example includes one or more antennae, cables, network connections, and/or other transmission technologies to access broadcast signals. In some examples, the media signal accessor 302 is capable of receiving metadata associated with the broadcast signals. For example, the metadata may provide identification information (e.g., a station name, a program name, a program duration, etc.) for media presentations conveyed by the broadcast signals. In some examples, the media signal accessor 302 is positioned in an optimized location where many media signals can be obtained (e.g., near broadcasting facilities). In some examples, the media signal accessor 302 may be more than one facility, enabling collection of media signals from a variety of locations. In some such examples, there may be a plurality of media measurement systems distributed in different areas to increase the number of perceptible media signals.

The watermark decoder 304 of the illustrated example of FIG. 3 detects and/or decodes watermarks embedded in broadcast signals. In some examples, to detect and/or decode watermarks in the media signal 104, the watermark decoder 304 can convert the media signal 104 into a format enabling identification of watermark components (e.g., tones). For example, the watermark decoder 304 can convert the media signal 104 into a frequency representation (e.g., a fast Fourier transform (FFT) representation, a discrete Fourier transform (DFT) representation), and/or any other representation of the media signal 104. In some examples, the watermark decoder 304 identifies watermark components based on boosted (e.g., amplified) amplitude values of specific frequency ranges of the media signal accessor 302. The watermark decoder 304 of the illustrated example may be configured to decode watermarks of multiple types and access identification information corresponding to the decoded watermarks (e.g., based on looking up codes from the decoded watermarks).

The watermark data structure generator 306 of the illustrated example of FIG. 3 generates and/or updates one or more watermark data structure(s) to associate watermarks of different watermark types observed in the media signal 104 when the watermarks correspond to a same media presentation. In some examples, the watermark data structure generator 306 utilizes an alignment time threshold, a signal threshold, and/or other criteria as previously described in association with the media monitor 110 to determine whether watermarks detected in the media signal 104 should be added to one or more watermark data structure(s). In some examples, the watermark data structure generator 306 utilizes metadata received with the media signal 104 to associate watermarks detected in the media signal 104 with media identification information. For example, if the media signal 104 includes metadata that indicates a media presentation from channel #1 is being presented from 12:30-1:00 PM, the watermark data structure generator 306 can associate any watermarks detected during this time period in the watermark data structure. In some examples, the watermarks can be added, updated and/or removed based on input from a user. In some examples, the watermark data structure generator 306 can access channel programming information from another component of the MMS 116 and/or another component of the AME 114 to associate watermarks with identification information from the channel programming information. For example, if the watermark data structure generator 306 has knowledge that the media signal 104 represents a broadcast titled "Cleveland Evening News" for a given time period, all watermarks observed during the given time period can be associated with an "Cleveland Evening News" entry in the watermark data structure.

The MMS data store 308 of the illustrated example of FIG. 3 stores watermark data structures generated by the watermark data structure generator 306. The MMS data store 308 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a nonvolatile memory (e.g., flash memory). The MMS data store 308 may additionally or alternatively be implemented by one or more double data rate (DDR) memories, such as DDR, DDR2, DDR3, mobile DDR (mDDR), etc. The MMS data store 308 may additionally or alternatively be implemented by one or more mass storage devices such as hard disk drive(s), compact disk drive(s) digital versatile disk drive(s), etc. While in the illustrated example the MMS data store 308 is illustrated as a single database, the MMS data store 308 may be implemented by any number and/or type(s) of databases. Furthermore, the data stored in the MMS data store 308 may be in any data format such as, for example, binary data, comma delimited data, tab delimited data, structured query language (SQL) structures, etc.

The watermark data structure transmitter 310 of the illustrated example of FIG. 3 transmits the watermark data structure 118 to the media monitor 110 and/or any other media monitoring devices. In some examples, the watermark data structure transmitter 310 regularly sends the watermark data structure 118 to the media monitor 110. In some examples, the watermark data structure transmitter 310 sends the watermark data structure 118 to the media monitor 110 in response to a request for the watermark data structure 118 from the media monitor 110.

In operation, the media signal accessor 302 accesses the media signal 104, along with any metadata associated with the media signal 104. The watermark decoder 304 detects and decodes watermarks in the media signal 104 and the watermark data structure generator 306 associates watermarks and adds them to a watermark data structure, which is stored in the MMS data store 308. The watermark data structure transmitter 310 transmits the watermark data structure 118 to the media monitor 110 and/or any other media monitoring devices.

While an example manner of implementing the MMS 116 of FIG. 1 is illustrated in FIG. 3, one or more of the elements, processes and/or devices illustrated in FIG. 3 may be combined, divided, re-arranged, omitted, eliminated and/or implemented in any other way. Further, the example media signal accessor 302, the example watermark decoder 304, the example watermark data structure generator 306, the example MMS data store 308, the example watermark data structure transmitter 310 and/or, more generally, the example MMS 116 of FIG. 3 may be implemented by hardware, software, firmware and/or any combination of hardware, software and/or firmware. Thus, for example, any of the example media signal accessor 302, the example watermark decoder 304, the example watermark data structure generator 306, the example MMS data store 308, the example watermark data structure transmitter 310 and/or, more generally, the example MMS 116 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s))

and/or field programmable logic device(s) (FPLD(s)). When reading any of the apparatus or system claims of this patent to cover a purely software and/or firmware implementation, at least one of the example media signal accessor 302, the example watermark decoder 304, the example watermark data structure generator 306, the example MMS data store 308, the example watermark data structure transmitter 310 and/or, more generally, the example MMS 116 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example MMS 116 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
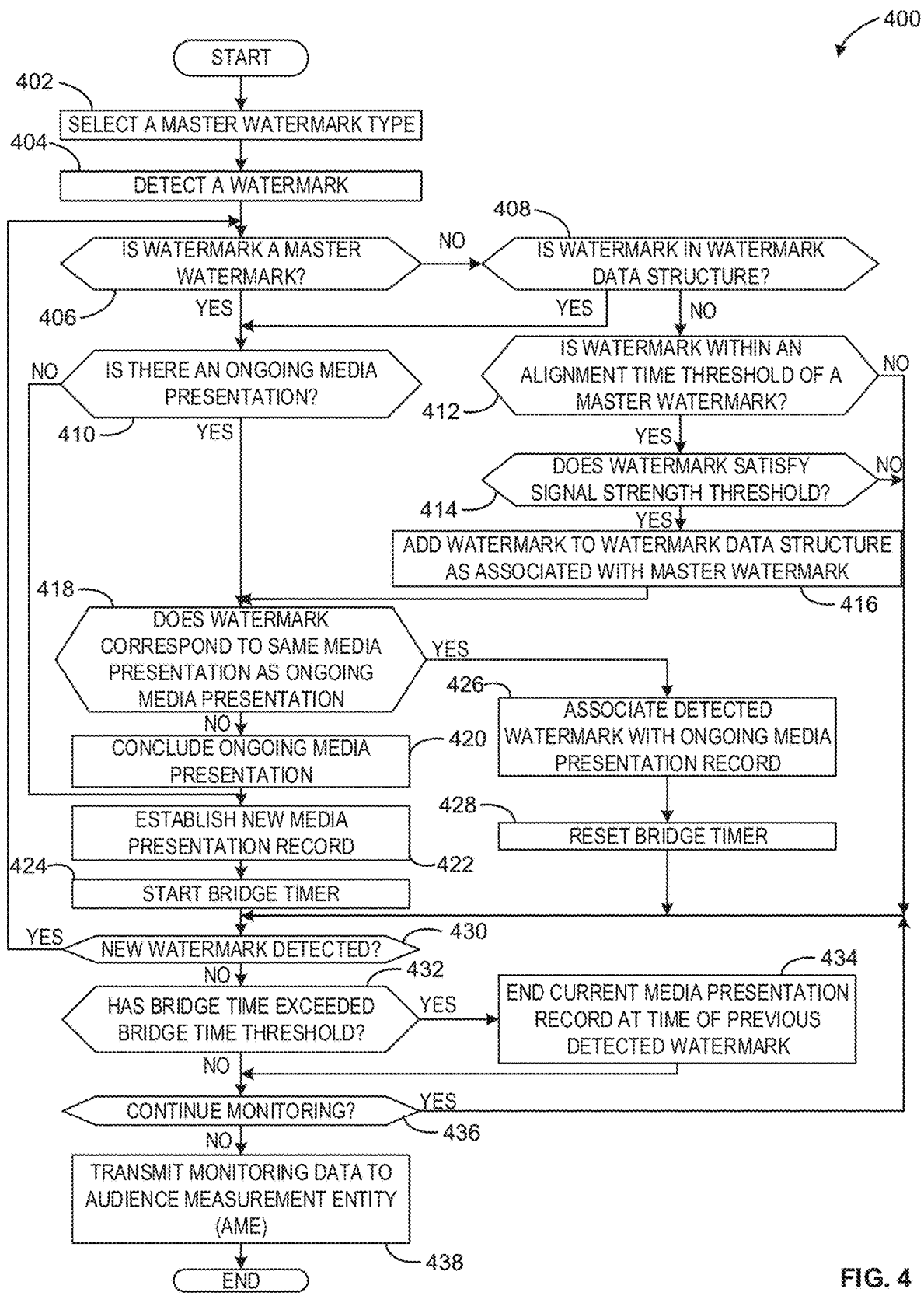
FIG. 4 is a flowchart representative of machine-readable instructions that may be executed to implement the media monitor of FIGS. 1 and 2 to measure media utilizing association of different watermarks.
Figure 5:
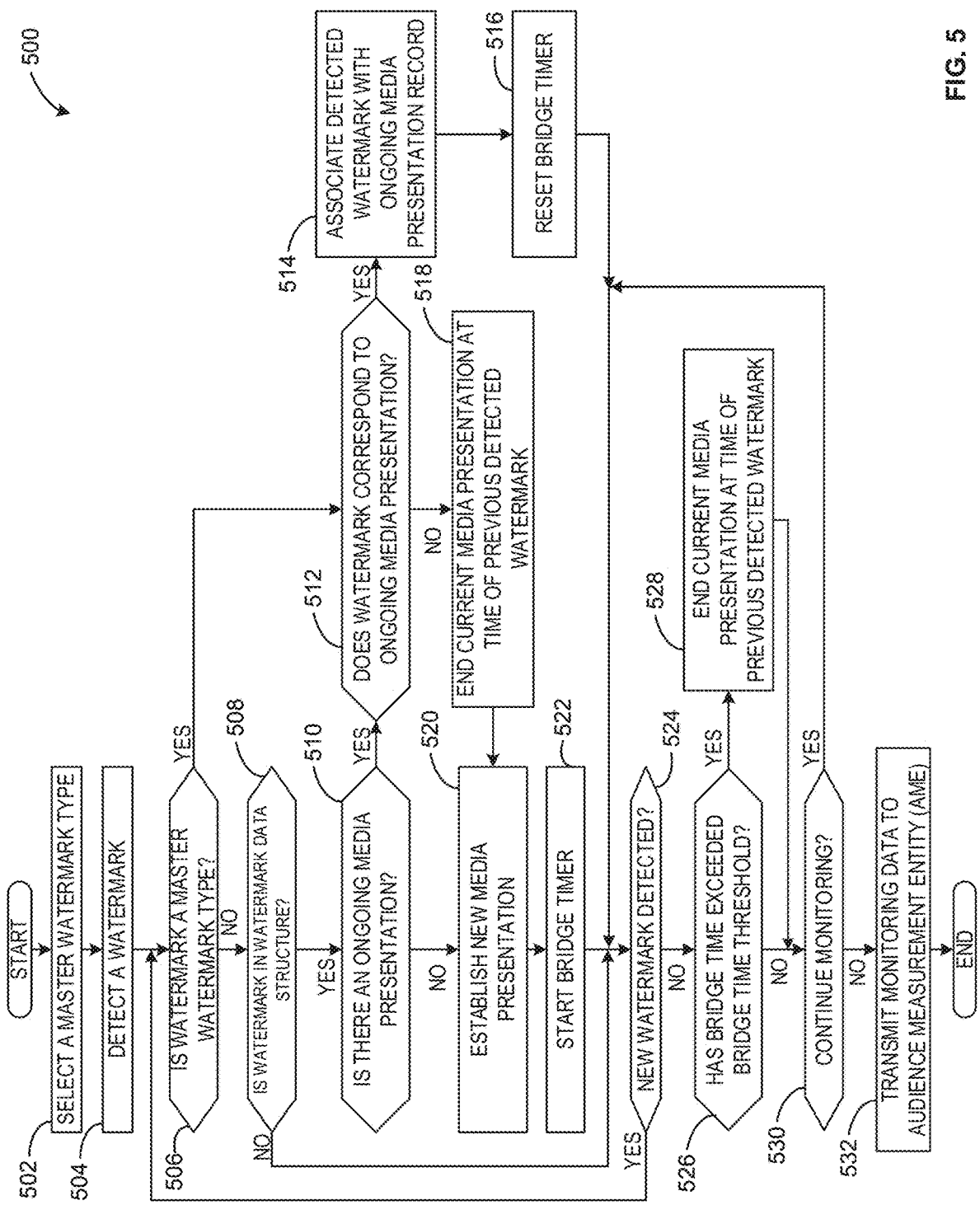
FIG. 5 is a flowchart representative of machine-readable instructions that may be executed to implement the media monitor of FIGS. 1 and 2 to measure media by associating different watermarks using an existing watermark data structure.

Flowcharts representative of example hardware logic, machine readable instructions, hardware implemented state machines, and/or any combination thereof for implementing the media monitor 110 of FIGS. 1 and 2 is shown in FIGS. 4 and 5. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4 and 5, many other methods of implementing the example media monitor 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4 and 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A. (2) at least one B, and (3) at least one A and at least one B.

Example machine readable instructions 400 that may be executed by the media monitor 110 of FIGS. 1 and 2 to measure media utilizing association of different watermarks are illustrated in FIG. 4. With reference to the preceding figures and associated descriptions, the example machine readable instructions 400 of FIG. 4 begin with the media monitor 110 selecting a master watermark type (Block 402). In some examples, the event generator 204 selects a master watermark type. For example, the event generator 204 can be configured with a list of preferred watermarks types to be used as master watermarks. In some examples, the event generator 204 selects a master watermark type based the types of available watermark detectors 202. In some examples, the event generator 204 selects a master watermark type based on the watermarks detected by the watermark detectors 202. In some examples, in response to select a master watermark type, the event generator 204 can transmit master watermarks to the media presentation identifier to inform media presentation records, and transmit non-master watermarks to the watermark data structure analyzer 208 for further analysis.

At block 404, the example media monitor 110 detects a watermark. In some examples, the one of the watermark detectors 202 detects a watermark. In some examples, the one of the watermark detectors 202 further decodes the watermark.

At block 406, the example media monitor 110 determines whether the detected watermark is a master watermark. In some examples, the event generator 204 determines whether the watermark is a master watermark. In response to the watermark being a master watermark, processing transfers to block 410. Conversely, in response to the watermark not being a master watermark, processing transfers to block 408.

At block 408, the example media monitor 110 determines if the detected watermark is in the watermark data structure. In some examples, the watermark data structure analyzer 208 determines if the detected watermark is associated with a master watermark by determining if the watermark is represented in the watermark data structure. In response to the watermark being in the watermark data structure, processing transfers to block 410. Conversely, in response to the watermark not being associated with a master watermark, processing transfers to block 412.

At block 410, the example media monitor 110 determines if there is an ongoing media presentation. In some examples, the media presentation identifier 214 determines whether there is an ongoing media presentation based on whether there is an open media presentation record. In some examples, the media presentation identifier 214 determines based on the bridge timer 212 whether a media presentation record should remain open (e.g., whether the media presentation is still ongoing) based on the bridge time threshold. In response to there being an ongoing media presentation, processing transfers to block 418. Conversely, in response to there not being an ongoing media presentation, processing transfers to block 422.

At block 412, the example media monitor 110 determines if the watermark is within an alignment time threshold of a master watermark. In some examples, the watermark data structure modifier 206 determines whether the watermark is within an alignment time threshold of a master watermark by comparing an elapsed time between the detected watermark and the nearest (in time) master watermark to the alignment time threshold. In some examples, the watermark data structure modifier determines whether the watermark is within the alignment time threshold of any watermark, to associate the detected watermark with another watermark (even if the other watermark is not a master watermark), since the master watermark can be changed by the event generator 204. In response to the watermark being within an alignment time threshold of a master watermark, processing transfers to block 414. Conversely, in response to the watermark not being within an alignment time threshold of a master watermark, processing transfers to block 430.

At block 414, the example media monitor 110 determines whether the watermark satisfies the signal strength threshold. In some examples, the watermark data structure modifier 206 determines whether the detected watermark satisfies the signal strength threshold. In some examples, the watermark data structure modifier 206 additionally determines whether the associated master watermark (e.g., the watermark within the alignment time threshold of the detected watermark) satisfies the signal strength threshold. In response to the detected watermark satisfying the signal strength threshold, processing transfers to block 416. Conversely, in response to the detected watermark not satisfying the signal strength threshold, processing transfers to block 430.

At block 416, the example media monitor 110 adds the detected watermark to the watermark data structure as associated with the master watermark. In some examples, the watermark data structure modifier 206 adds the watermark to the watermark data structure 118 as associated with the master watermark. For example, the watermark data structure modifier 206 can add the watermark to the watermark data structure in a same row or column as other watermarks corresponding to the same media. In some examples, the watermark data structure modifier 206 adds the detected watermark to the watermark data structure in association with a second watermark in response to the detected watermark being within the alignment time threshold of the second watermark (regardless of whether the second watermark is a master watermark).

At block 418, the example media monitor 110 determines whether the detected watermark corresponds to a same media presentation as the ongoing media presentation. In some examples, the media presentation identifier 214 determines whether the detected watermark corresponds to the same media presentation as the ongoing media presentation. In response to the watermark corresponding to the same media presentation as the ongoing media presentation, processing transfers to block 426. Conversely, in response to the watermark not corresponding to the same media presentation as the ongoing media presentation, processing transfers to block 420.

At block 420, the example media monitor 110 concludes the ongoing media presentation. In some examples, the media presentation identifier 214 concludes the ongoing media presentation by indicating that the time of the last detected watermark of the ongoing media presentation was the end time for the ongoing media presentation.

At block 422, the example media monitor 110 establishes a new media presentation record. In some examples, the media presentation identifier 214 establishes a new media presentation record. The media presentation identifier 214 can establish the new media presentation record with a start time corresponding to the time of the detected watermark.

At block 424, the example media monitor 110 starts the bridge timer 212. In some examples, the media presentation identifier 214 communicates to the bridge timer 212 to start timing a duration since the prior detected watermark.

At block 426, the example media monitor 110 associates the detected watermark with the ongoing media presentation record. For example, the media presentation identifier 214 can associate the detected watermark with the ongoing media presentation record by determining and indicating that the detected watermark corresponds to the same media as a master watermark being used to directly inform the ongoing media presentation record. In some examples, the media presentation identifier 214 associates the detected watermark with the master watermark corresponding to of the ongoing media presentation record.

At block 428, the example media monitor 110 resets the bridge timer 212. In some examples, the media presentation identifier 214 communicates to the bridge timer 212 to reset the bridge timer 212.

At block 430, the example media monitor 110 determines whether a new watermark has been detected. In some examples, the watermark detectors 202 determine whether a new watermark has been detected. In response to a new watermark being detected, processing transfers to block 406. Conversely, in response to a new watermark not being detected, processing transfers to block 432.

At block 432, the example media monitor 110 determines whether the bridge time has exceeded the bridge time threshold. In some examples, the bridge timer 212 determines whether the bridge time has exceeded the bridge time threshold. In response to the bridge time exceeding the bridge time threshold, processing transfers to block 434. Conversely, in response to the bridge time not exceeding the bridge time threshold, processing transfers to block 436.

At block 434, the example media monitor 110 ends a current media presentation record at a time of the previous detected watermark. In some examples, the media presentation identifier 214 ends a current media presentation record at the time of the previous detected watermark.

At block 436, the example media monitor 110 determines whether to continue monitoring. In response to continuing monitoring, processing transfers to block 430. Conversely, in response to not continuing monitoring, processing transfers to block 438.

At block 438, the example media monitor 110 transmits monitoring data to the AME 114. In some examples, the monitoring data transmitter 216 transmits monitoring data to the back office processing system 120 of the AME 114.

Example machine readable instructions 500 that may be executed by the media monitor 110 of FIGS. 1 and 2 to measure media by associating different watermarks using an existing watermark data structure are illustrated in FIG. 5. With reference to the preceding figures and associated descriptions, the example machine readable instructions 500 of FIG. 5 begin with the example media monitor 110 selecting a master watermark type (Block 502). In some examples, the event generator 204 selects a master watermark type. For example, the event generator 204 can be configured with a list of preferred watermarks types to be used as master watermarks. In some examples, the event generator 204 selects a master watermark type based on the types of available watermark detectors 202. In some examples, the event generator 204 selects a master watermark type based on the watermarks detected by the watermark detectors 202. In some examples, in response to select a master watermark type, the event generator 204 can transmit master watermarks to the media presentation identifier to inform media presentation records, and transmit non-master watermarks to the watermark data structure analyzer 208 for further analysis.

At block 504, the example media monitor 110 detects a watermark. In some examples, the watermark detectors 202 detect a watermark. In some examples, the watermark detectors 202 further decode the watermark.

At block 506, the example media monitor 110 determines whether the detected watermark is a master watermark. In some examples, the event generator 204 determines whether the watermark is a master watermark. In response to the watermark being a master watermark, processing transfers to block 512. Conversely, in response to the watermark not being a master watermark, processing transfers to block 508.

At block 508, the example media monitor 110 determines if the watermark is in the watermark data structure. In some examples, the watermark data structure analyzer 208 determines if the watermark is in the watermark data structure 118. In some examples, the watermark data structure analyzer 208 determines if the detected watermark is associated with a master watermark in the watermark data structure 118. In response to the watermark being in the watermark data structure, processing transfers to block 510. Conversely, in response to the watermark not being in the watermark data structure, processing transfers to block 524.

At block 510, the example media monitor 110 determines if there is an ongoing media presentation. In some examples, the media presentation identifier 214 determines if there is an ongoing media presentation (e.g., an open media presentation record). In response to there being an ongoing media presentation, processing transfers to block 512. Conversely, in response to there not being an ongoing media presentation, processing transfers to block 520.

At block 512, the example media monitor 110 determines whether the detected watermark corresponds to the ongoing media presentation. In some examples, the media presentation identifier 214 compares identification information for the detected watermark (e.g., from the event generator 204 and/or the watermark data structure analyzer 208) with the ongoing media presentation (e.g., the open media presentation record). In response to the watermark corresponding to the ongoing media presentation, processing transfers to block 514. Conversely, in response to the watermark not corresponding to the ongoing media presentation, processing transfers to block 518.

At block 514, the example media monitor 110 associates the detected watermark with the ongoing media presentation record. In some examples, the media presentation identifier 214 associates the detected watermark with the ongoing media presentation record. For example, the media presentation identifier 214 can associate the detected watermark with the ongoing media presentation record by determining and indicating that the detected watermark corresponds to the same media as a master watermark being used to directly inform the ongoing media presentation record. In some examples, the media presentation identifier 214 associates the detected watermark with the master watermark corresponding to the ongoing media presentation record.

At block 516, the example media monitor 110 resets the bridge timer 212. In some examples, the media presentation identifier 214 communicates to the bridge timer 212 to reset the bridge timer.

At block 518, the example media monitor 110 ends a current media presentation at a time of a previous detected watermark. In some examples, the media presentation identifier 214 ends the current media presentation at the time of the previous detected watermark.

At block 520, the example media monitor 110 establishes a new media presentation. In some examples, the media presentation identifier 214 establishes the new media presentation by opening a new media presentation record.

At block 522, the example media monitor 110 starts the bridge timer 212. In some examples, the media presentation identifier 214 communicates to the bridge timer 212 to start timing a duration since the prior detected watermark.

At block 524, the example media monitor 110 determines if a new watermark has been detected. In some examples, the watermark detectors 202 determine if a new watermark has been detected. In response to a new watermark being detected, processing transfers to block 506. Conversely, in response to a new watermark not being detected, processing transfers to block 526.

At block 526, the example media monitor 110 determines if the bridge time has exceeded the bridge time threshold. In some examples, the bridge timer 212 determines if the bridge time has exceeded the bridge time threshold. In response to the bridge time exceeding the bridge time threshold, processing transfers to block 528. Conversely, in response to the bridge time not exceeding the bridge time threshold, processing transfers to block 530.

At block 528, the example media monitor 110 ends a current media presentation at a time of a previous detected watermark. In some examples, the media presentation identifier 214 ends the current media presentation at the time of the previous detected watermark.

At block 530, the example media monitor 110 determines whether to continue monitoring. In response to continuing monitoring, processing transfers to block 524. Conversely, in response to not continuing monitoring, processing transfers to block 532.

At block 532, the example media monitor 110 transmits monitoring data to the AME 114. In some examples, the monitoring data transmitter 216 transmits monitoring data to the back office processing system 120 of the AME 114.

Figure 6:
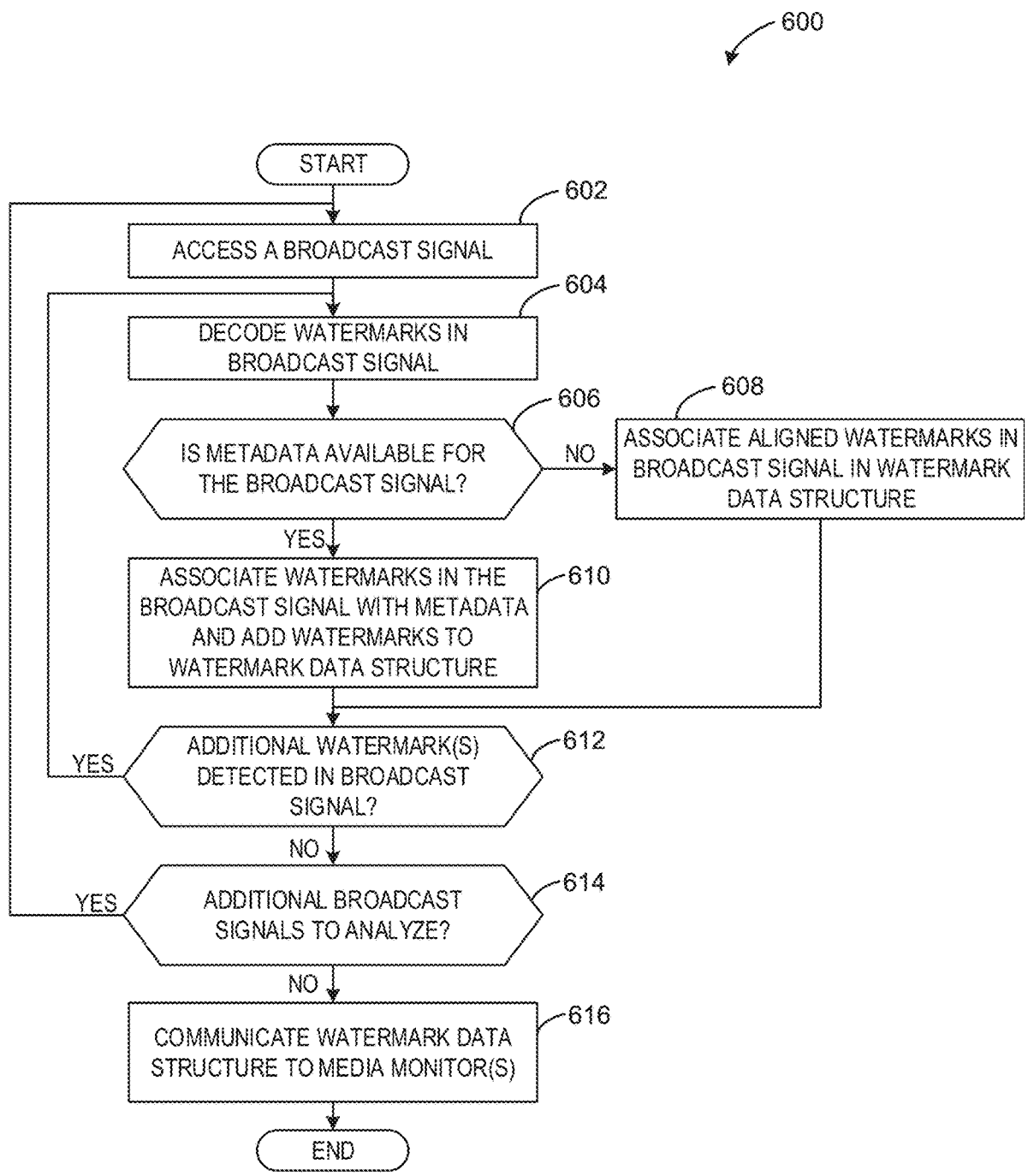
FIG. 6 is a flowchart representative of machine-readable instructions that may be executed to implement the MMS of FIG. 3 to generate a watermark data structure.

A flowchart representative of example hardware logic, machine readable instructions, hardware implemented state machines, and/or any combination thereof for implementing the MMS 116 of FIG. 1 is shown in FIG. 6. The machine readable instructions may be an executable program or portion of an executable program for execution by a computer processor such as the processor 1012 shown in the example processor platform 1000 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 6, many other methods of implementing the example MMS 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Example machine readable instructions 600 that may be executed by the MMS 116 of FIGS. 1 and 3 to generate a watermark data structure are illustrated in FIG. 6. With reference to the preceding figures and associated descriptions, the example machine readable instructions 600 of FIG. 6 begin with the example MMS 116 accessing a broadcast signal (Block 602). In some examples, the media signal accessor 302 accesses the media signal 104.

At block 604, the example MMS 116 decodes watermarks in the media signal 104. In some examples, the watermark decoder 304 detects and/or decodes watermarks in the media signal 104.

At block 606, the example MMS 116 determines if metadata is available for the media signal 104. In some examples, the media signal accessor 302 determines if metadata is available for the media signal 104. In response to metadata being available for the media signal 104, processing transfers to block 610. Conversely, in response to no metadata being available for the media signal 104, processing transfers to block 608.

At block 608, the example MMS 116 associates aligned watermarks in the media signal 104 in the watermark data structure 118. In some examples, the watermark data structure generator 306 associates aligned watermarks in the media signal 104 in the watermark data structure 118.

At block 610, the example MMS 116 associates watermarks in the media signal 104 with the metadata and adds the watermarks to the watermark data structure 118. In some examples, the watermark data structure generator 306 associates watermarks in the media signal 104 with the metadata and adds the watermarks to the watermark data structure 118.

At block 612, the example MMS 116 determines if additional watermark(s) have been detected in the media signal 104. In some examples, the watermark decoder 304 determines if additional watermark(s) have been detected in the media signal 104. In response to additional watermark(s) being detected in the media signal 104, processing transfers to block 604. Conversely, in response to no additional watermark(s) being detected in the media signal 104, processing transfers to block 614.

At block 614, the example MMS 116 determines if there are additional broadcast signals to analyze. In some examples, the media signal accessor 302 determines if there are additional broadcast signals to analyze. In response to determining there are additional broadcast signals to analyze, processing transfers to block 602. Conversely, in response to determining there are no additional broadcast signals to analyze, processing transfers to block 616.

At block 616, the example MMS 116 communicates the watermark data structure to one or more media monitor(s). In some examples, the watermark data structure transmitter 310 communicates the watermark data structure 118 to the media monitor 110.

FIG. 7A is a first schematic 700 depicting example media presentations and corresponding watermarks decoded during the media presentations. The schematic 700 includes an example horizontal axis 702 depicting time values, increasing from left to right, and an example vertical axis 704 divided into rows depicting media presentations and watermarks detected during the media presentations. An example top row 706 of the vertical axis 704 illustrates media identification information. For example, the top row 706 illustrates an example first media presentation 708 corresponding to channel #1 and an example second media presentation 710 corresponding to channel #2. The subsequent rows of the table depict watermarks corresponding to an example first watermark type 712, an example second watermark type 714, and an example third watermark type 716. In the illustrated example of FIG. 7A, the first watermark type 712 is selected (e.g., by the event generator 204) as a master watermark type (e.g., it is in use for media presentation records). The second watermark type 714 and the third watermark type 716 are initially unassociated unless a watermark data structure is utilized to respectively associate the second watermark type 714 and the third watermark type 716 with the first watermark type 712. In other examples, the event generator 204 may select any of the first, second, or third watermark types 712, 714, 716 to serve as the master watermark type.

At an example first time 718 in the schematic 700, a first watermark code (149) of the first watermark type 712 is detected and decoded. As the first watermark type 712 is a master watermark type, the media monitor 110 and/or the MMS 116 can utilize this code to establish a media presentation record. In addition to the first watermark code of the first watermark type, a second watermark code (250) of the second watermark type 714 and a third watermark code (4) of the third watermark type 716 are detected within an alignment time threshold 720 of the first time 718. Thus, if the media monitor 110 were operating utilizing association to generate a watermark data structure, the second watermark code (250) and the third watermark code (4) could be associated in the watermark data structure with the first watermark code (149) of the first watermark type 712. In some examples, the watermark data structure may already include these codes, based on a prior association made at the media monitor 110 and/or a watermark data structure generated at the MMS 116.

At an example second time 722 in the schematic 700, the first watermark code of the first watermark type 712 is detected again, but the first watermark code of the first watermark type 712 is not detected within an example bridge time threshold 724 after the second time 722. Thus, without associating different watermarks in the watermark data structure, the first media presentation 708 (e.g., associated with Channel #1) would be determined to have concluded at the second time 722. However, the second watermark code of the second watermark type 714 and the third watermark code (4) of the third watermark type 716 are detected within the bridge time threshold 724, thus enabling the bridge time to be reset (e.g., on the bridge timer 212) and a more accurate end time of the first media presentation 708 to be determined.

Thus, the accurate continuity of the first media presentation 708 is preserved.

At an example third time 726 in the schematic 700, the second watermark code of the second watermark type 714 and the third watermark code of the third watermark type 716 are detected, but no watermarks of the first, second, or third watermark codes are detected within the bridge time threshold 724 after the third time 726.

At an example fourth time 728 in the schematic 700, a fourth watermark code (170) of the first watermark type 712 is observed, corresponding to the second media presentation 710. No additional instances of the fourth watermark code of the first watermark type 712 (e.g., the master watermark) are observed within the bridge time threshold 724. However, if the media monitor 110 utilizes association and/or an existing watermark data structure, a fifth watermark code (15) of the second watermark type 714 may be determined to be associated the with fourth watermark code (170) of the first watermark type 712. When both the fourth watermark code (170) and the fifth watermark code (15) are associated with the second media presentation (726) in the watermark data structure, an accurate duration of the second media presentation can be determined, as opposed to terminating the media presentation record corresponding to the second media presentation 710 at the fourth time 728.

FIG. 7B is a watermark data structure represented as an example table 730 of watermarks and corresponding to identification information associated with the media presentation sessions represented in FIG. 7A. The table includes a column for the first watermark type 712, a column for the second watermark type 714, and a column for the third watermark type 716. In some examples, the table 730 is generated by the MMS 116 and is communicated to the media monitor 110. In some examples, the table 730 is generated via association, whereby watermark codes are added to the table as they are observed and determined to satisfy a plurality of conditions (e.g., the alignment time threshold, the signal strength threshold, etc.). The table 730 includes rows for the first media presentation 708, the second media presentation 710, as well as an example third media presentation 732 and an example fourth media presentation 734. The third media presentation 732 and the fourth media presentation 734 do not occur in the timeframe of the schematic 700 of FIG. 7A, but may have been observed previously by the media monitor 110 and/or observed by the MMS 116 if the watermark data structure was generated at the MMS 116.

The table 730 is queried by the media monitor 110 when a non-master watermark is detected. For example, in response to receiving a non-master watermark from the event generator 204, the watermark data structure analyzer 208 can query the watermark code against the table 730. For example, at the third time 726, the second watermark code (250) and the third watermark code (4) are detected. When the table 730 is queried for these values, the table 730 outputs that these values correspond to the first media presentation 708. Thus, the media presentation identifier 214 can associate the second watermark code (714) and the third watermark code (712) with the first watermark code (714) and/or with the first media presentation 708. Some of the watermark types list "N/A" under some of the media presentations, indicating that these watermark types have not been observed for these media presentations. If a new watermark of these types is detected and satisfies various thresholds (e.g., the alignment time threshold, the signal strength threshold, etc.) indicating it is associated with a media presentation, a watermark code of the newly detected watermark can be added to the table 730.

FIG. 8 is a second example schematic 800 depicting the example media presentations of FIG. 7A, but with alternate watermarks decoded during the media presentations. At an example fifth time 802, the first watermark code (149) of the first watermark type 712 is detected. However, no other watermarks of the second watermark type 714 or the third watermark type 716 are detected within the alignment time threshold 720. A subsequent instance of the first watermark code (149) is detected shortly after, at an example sixth time 804. At the sixth time 804, no watermarks of the second watermark type 714 or the third watermark type 716 are detected within the alignment time threshold 720. If the media monitor 110 does not already have any other watermark types associated with the first watermark code (149) in the watermark data structure, the first media presentation 708 may be determined to have concluded at the sixth time 804. Similarly, some conventional techniques for media measurement utilizing only one type of watermark to inform a media presentation record would inaccurately conclude a media presentation record at the sixth time 804.

However, if the media monitor 110 accesses a watermark data structure indicating that the first watermark code (149) is associated with the second watermark code (250) and/or the third watermark code (4), the media presentation record is extended, since instances of the second watermark code (250) and the third watermark code (4) are detected within the bridge time threshold 724.

At an example seventh time 806, the fifth watermark code (15) of the second watermark type 714 is detected. As the second watermark type 714 is not currently the master watermark, the media monitor 110 requires a watermark data structure associating the fifth watermark code (15) of the second watermark type 714 with the fourth watermark code (170) of the first watermark type 712 and/or with the second media presentation 710 in order to establish a media presentation record for the second media presentation 710. If the watermark data structure associating these codes does not exist, the media presentation record may not be established until an example eighth time 808, when a first instance of the forth watermark code (170) is detected.

However, the event generator 204 can select the second watermark type 714 as the master watermark in response to receiving a plurality of watermarks of the second type (and few of the first and second watermark types 712, 716).

After the eighth time 808, the fifth watermark code (15) is detected within the alignment time threshold 720 of the forth watermark code (170) and thus can be associated with the forth watermark code (170) in a watermark data structure, if the codes are not already associated in the watermark data structure. Following the eighth time 808, instances of the fifth watermark code (15) are detected within the bridge time threshold 724, thus enabling an accurate media presentation record for the second media presentation 710.

Figure 9:
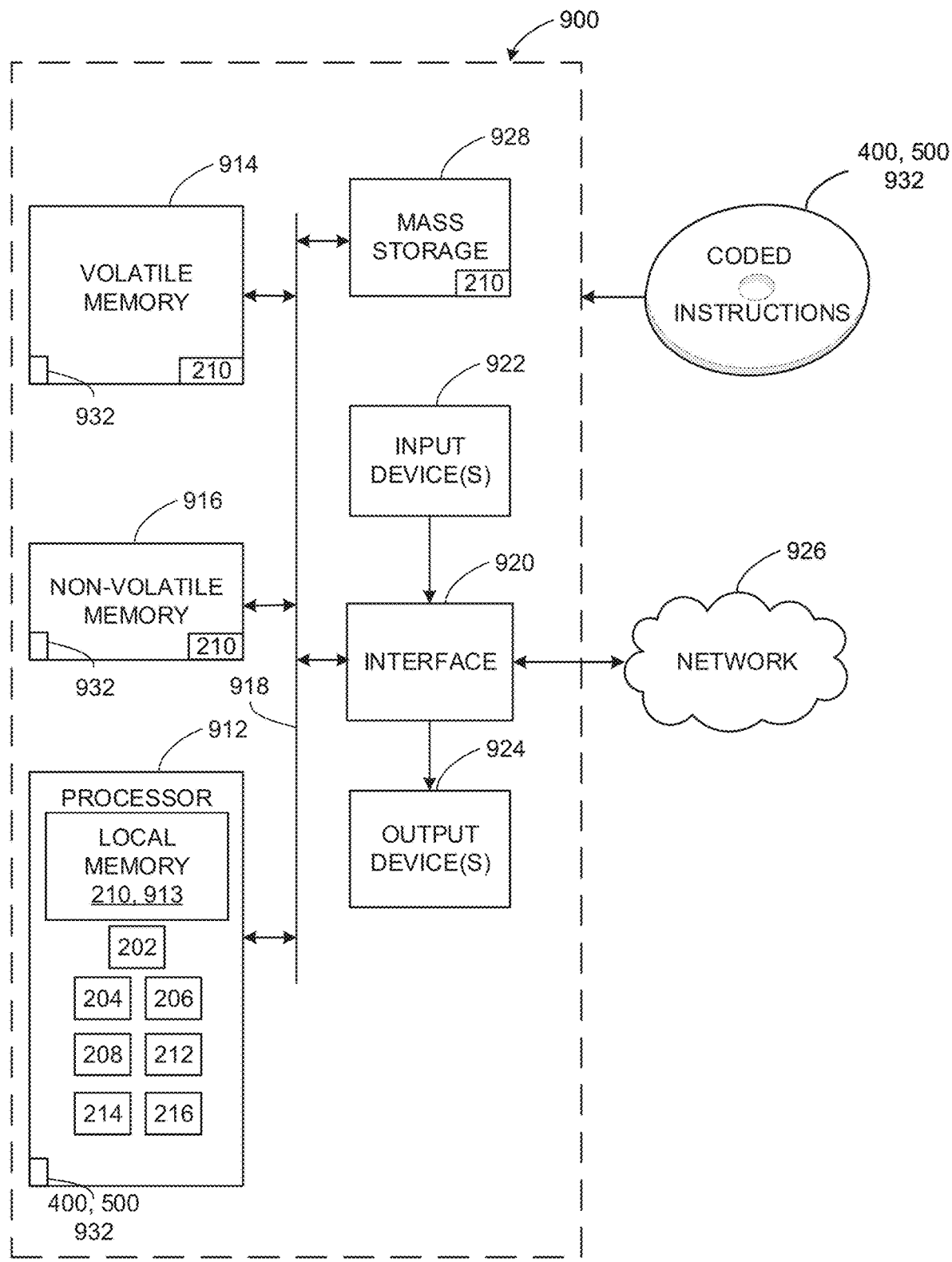
FIG. 9 is a block diagram of an example processor platform structured to execute the example machine readable instructions of FIGS. 4 and/or 5 to implement the example media monitor of FIG. 2.

FIG. 9 is a block diagram of an example processor platform 900 structured to execute the instructions of FIGS. 4-5 to implement the media monitor 110 of FIG. 3 The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example watermark detectors 202, the example event generator 204, the example watermark data structure modifier 206, the example watermark data structure analyzer 208, the example data store 210, the example bridge timer 212, the example media presentation identifier 214, the example monitoring data transmitter 216 and/or, more generally, the example media monitor 110.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932, 400, 500 of FIGS. 4 and 5 may be stored in the mass storage device 928, in the volatile memory 914, in the nonvolatile memory 916, and/or on a removable non-transitory computer readable storage medium such as a CD or DVD.

Figure 10:
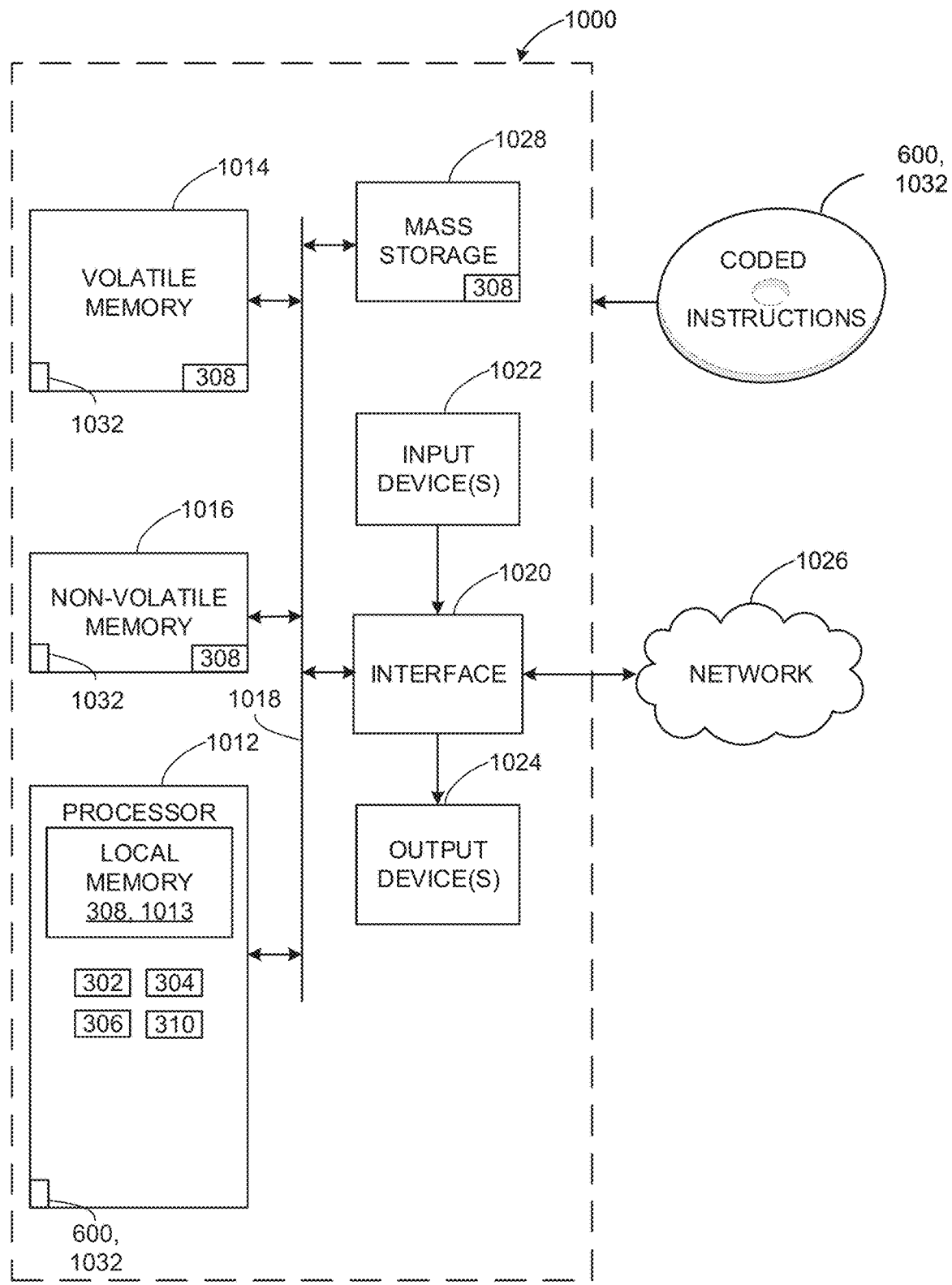
FIG. 10 is a block diagram of an example processor platform structured to execute the example machine readable instructions of FIG. 6 to implement the media measurement system (MMS) of FIG. 3.

FIG. 10 is a block diagram of an example processor platform 1000 structured to execute the instructions of FIG. 6 to implement the MMS 116 of FIGS. 1 and 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media signal accessor 302, the example watermark decoder 304, the example watermark data structure generator 306, the example MMS data store 308, the example watermark data structure transmitter 310 and/or, more generally, the example MMS 116.

The processor 1012 of the illustrated example includes a local memory 1013 (e.g., a cache). The processor 1012 of the illustrated example is in communication with a main memory including a volatile memory 1014 and a nonvolatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032, 600 of FIG. 6 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that enable generation of accurate media monitoring data by associating different watermarks detected in media to expand the realm of watermarks that can be identified at a media monitoring device and/or location. By making use of a plurality of types of watermarks available in a media signal, media presentation records reflecting accurate start and stop times can be established. Example techniques disclosed herein enable association of watermarks of different watermark types that are detected within an alignment threshold time, thus aiding generation of a watermark data structure that can be subsequently used to identify media presentations. Example techniques disclosed herein enable generation of watermark data structures at a media monitoring system for use at one or more media monitors and/or media monitoring locations. The disclosed methods, apparatus and articles of manufacture improve the efficiency of using a computing device by enabling watermark identification via referencing a watermark data structure as opposed to potentially more computationally intensive identification processes. The disclosed methods, apparatus and articles of manufacture are accordingly directed to one or more improvement(s) in the functioning of a computer.

An example media monitoring apparatus is disclosed. The example apparatus includes a watermark data structure analyzer to determine whether a first watermark detected in a media signal is represented in a watermark data structure, a watermark data structure modifier to, in response to the first watermark not being in the watermark data structure, modify the watermark data structure to associate the first watermark with a second watermark when the first watermark occurs within an alignment time threshold of the second watermark, a media presentation identifier to associate the first watermark with a first media presentation record associated with the second watermark in response to the first watermark being associated in the watermark data structure with the second watermark, and a monitoring data transmitter to transmit monitoring data including the first media presentation record to an audience measurement entity.

In some examples, the media presentation identifier is to terminate the first media presentation record in response to a time since detection of a previous watermark associated with the first media presentation record exceeding a threshold.

In some examples, the media presentation identifier is to reset a bridge timer in response to the media presentation identifier associating the first watermark with the first media presentation record, the bridge timer to track the time since detection of the previous watermark associated with the first media presentation record.

In some examples, the media presentation identifier to terminate the first media presentation record in response to the first watermark being associated with a second media presentation record.

In some examples, the watermark data structure modifier is to, in response to the first watermark not being in the watermark data structure, modify the watermark data structure to associate the first watermark with the second watermark when the first watermark satisfies a signal strength threshold.

In some examples, the media presentation identifier is to associate the first watermark with the first media presentation record in response to the first watermark being within the alignment time threshold of the second watermark.

In some examples, the media presentation identifier is to associate the first watermark with the first media presentation record in response to the first watermark matching the second watermark.

In some examples, the watermark data structure is received from a media measurement system.

Also disclosed herein is an example non-transitory computer readable storage medium comprising computer readable instructions that, when executed, cause a processor to at least determine whether a first watermark detected in a media signal is represented in a watermark data structure, associate the first watermark with a first media presentation record associated with a second watermark in response to the first watermark being associated in the watermark data structure with the second watermark, and transmit monitoring data including the first media presentation record to an audience measurement entity.

In some examples, the instructions, when executed, further cause the processor to terminate the first media presentation record in response to a time since detection of a previous watermark associated with the first media presentation record exceeding a threshold.

In some examples, the instructions, when executed, further cause the processor to reset a bridge timer in response to associating the first watermark with the first media presentation record, the bridge timer to track the time since detection of the previous watermark associated with the first media presentation record.

In some examples, the instructions, when executed, further cause the processor to terminate the first media presentation record in response to the first watermark being associated with a second media presentation record.

In some examples, the instructions, when executed, further cause the processor to, in response to the first watermark not being in the watermark data structure, modify the watermark data structure to associate the first watermark with the second watermark when the first watermark satisfies a signal strength threshold.

In some examples, the instructions, when executed, further cause the processor to associate the first watermark with the first media presentation record in response to the first watermark being within an alignment time threshold of the second watermark.

In some examples, the instructions, when executed, further cause the processor to associate the first watermark with the first media presentation record in response to the first watermark matching the second watermark.

In some examples, the watermark data structure is received from a media measurement system.

Also disclosed herein is a method to monitor media. The example method includes determining whether a first watermark detected in a media signal is represented in a watermark data structure, associating the first watermark with a first media presentation record associated with a second watermark in response to the first watermark being associated in the watermark data structure with the second watermark, and transmitting monitoring data including the first media presentation record to an audience measurement entity.

In some examples, the method further includes modifying the watermark data structure to associate the first watermark with the second watermark when the first watermark satisfies a signal strength threshold, in response to the first watermark not being in the watermark data structure.

In some examples, the method further includes terminating the first media presentation record in response to the first watermark being associated with a second media presentation record.

In some examples, the method further includes terminating the first media presentation record in response to a time since detection of a previous watermark associated with the first media presentation record exceeding a threshold.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   detecting a first watermark corresponding to a first media presentation;
   associating the first watermark with an ongoing media presentation record in a watermark data structure when the ongoing media presentation record corresponds to the first media presentation;
   detecting a second watermark;
   determining that the second watermark corresponds to a second media presentation different than the first media presentation;
   updating, based on the determining, the ongoing media presentation record in the watermark data structure to end at a time corresponding to the first watermark being detected to form a previously-presented media presentation record;
   generating, based on the determining, a new ongoing media presentation record associated with the second media presentation and the second watermark; and
   starting a bridge timer for the new ongoing media presentation record,
      wherein the bridge timer tracks a bridge time which corresponds to a duration of time since the detecting of the second watermark, and
      wherein the bridge timer is used to determine when the new ongoing media presentation record ends.

2. The method of claim 1, further comprising:
   determining that the ongoing media presentation record corresponds to the first media presentation by:
      comparing identification information of the first watermark with identification information of the ongoing media presentation record.

3. The method of claim 2, further comprising:
   determining that the ongoing media presentation record corresponds to the first media presentation by:
      determining that the first watermark is a master watermark associated with the ongoing media presentation record.

4. The method of claim 1, further comprising:
   transmitting, to a server, the watermark data structure.

5. The method of claim 1, wherein the determining that the second watermark corresponds to the second media presentation different than the first media presentation comprises comparing identification information of the second watermark with identification information of the ongoing media presentation record.

6. The method of claim 5, wherein the second watermark is a different type of watermark than the first watermark.

7. The method of claim 1,
   wherein the bridge timer includes a bridge timer threshold, and
   wherein the bridge timer threshold indicates a maximum duration between matching watermarks that is considered to correspond to a same underlying media presentation.

8. The method of claim 7, further comprising:
   detecting a third watermark, wherein the third watermark is a different type of watermark than the second watermark;
   and
   updating the new ongoing media presentation record to associate the third watermark with the new ongoing media presentation record when:
      the bridge time is between the detecting of the second watermark and the detecting of the third watermark is within the bridge timer threshold, and
      the third watermark corresponds to the second media presentation.

9. The method of claim 7, further comprising:
   detecting a third watermark, wherein the third watermark is a same type of watermark as the second watermark;
   determining that the third watermark corresponds to the second media presentation; and
   updating the new ongoing media presentation record in the watermark data structure to end at a time corresponding to the second watermark being detected when the bridge time between the detecting of the second watermark and the detecting of the third watermark exceeds the bridge timer threshold.

10. A computing system comprising:
a processor; and
a non-transitory computer-readable storage medium, having stored thereon program instructions that, upon execution by the processor, cause performance of a set of operations comprising:
  detecting a first watermark corresponding to a first media presentation;
  associating the first watermark with an ongoing media presentation record in a watermark data structure when the ongoing media presentation record corresponds to the first media presentation;
  detecting a second watermark;
  determining that the second watermark corresponds to a second media presentation different than the first media presentation;
  updating, based on the determining, the ongoing media presentation record in the watermark data structure to end at a time corresponding to the first watermark being detected to form a previously-presented media presentation record;
  generating, based on the determining, a new ongoing media presentation record associated with the second media presentation and the second watermark; and
  starting a bridge timer for the new ongoing media presentation record,
    wherein the bridge timer tracks a bridge time which corresponds to a duration of time since the detecting of the second watermark, and
    wherein the bridge timer is used to determine when the new ongoing media presentation record ends.

11. The computing system of claim 10, wherein the determining that the second watermark corresponds to the second media presentation different than the first media presentation comprises comparing identification information of the second watermark with identification information of the ongoing media presentation record.

12. The computing system of claim 10, further comprising:
  transmitting, to a server, the watermark data structure.

13. The computing system of claim 10,
  wherein the bridge timer includes a bridge timer threshold, and
  wherein the bridge timer threshold indicates a maximum duration between matching watermarks that is considered to correspond to a same underlying media presentation.

14. The computing system of claim 13, further comprising:
  detecting a third watermark, wherein the third watermark is a different type of watermark than the second watermark;
  and
  updating the new ongoing media presentation record to associate the third watermark with the new ongoing media presentation record when:
    the bridge time is between the detecting of the second watermark and the detecting of the third watermark is within the bridge timer threshold, and
    the third watermark corresponds to the second media presentation.

15. The computing system of claim 13, further comprising:
  detecting a third watermark, wherein the third watermark is a same type of watermark as the second watermark;
  determining that the third watermark corresponds to the second media presentation; and
  updating the new ongoing media presentation record in the watermark data structure to end at a time corresponding to the second watermark being detected when the bridge time between the detecting of the second watermark and the detecting of the third watermark exceeds the bridge timer threshold.

16. A non-transitory computer-readable storage medium, having stored thereon program instructions that, upon execution by a processor, cause performance of a set of operations comprising:
  detecting a first watermark corresponding to a first media presentation;
  associating the first watermark with an ongoing media presentation record in a watermark data structure when the ongoing media presentation record corresponds to the first media presentation;
  detecting a second watermark;
  determining that the second watermark corresponds to a second media presentation different than the first media presentation;
  updating, based on the determining, the ongoing media presentation record in the watermark data structure to end at a time corresponding to the first watermark being detected to form a previously-presented media presentation record;
  generating, based on the determining, a new ongoing media presentation record associated with the second media presentation and the second watermark;
  and
  starting a bridge timer for the new ongoing media presentation record,
    wherein the bridge timer tracks a bridge time which corresponds to a duration of time since the detecting of the second watermark, and
    wherein the bridge timer is used to determine when the new ongoing media presentation record ends.

17. The non-transitory computer-readable storage medium of claim 16, wherein the set of operations further comprise:
  determining that the ongoing media presentation corresponds to the first media presentation by:
    comparing identification information of the first watermark with identification information of the ongoing media presentation record.

18. The non-transitory computer-readable storage medium of claim 16,
  wherein the bridge timer includes a bridge timer threshold, and
  wherein the bridge timer threshold indicates a maximum duration between matching watermarks that is considered to correspond to a same underlying media presentation.

19. The non-transitory computer-readable storage medium of claim 18, further comprising:
  detecting a third watermark, wherein the third watermark is a different type of watermark than the second watermark; and
  updating the new ongoing media presentation record to associate the third watermark with the new ongoing media presentation record when:

the bridge time is between the detecting of the second watermark and the detecting of the third watermark is within the bridge timer threshold, and the third watermark corresponds to the second media presentation.

20. The non-transitory computer-readable storage medium of claim 18, further comprising:

detecting a third watermark, wherein the third watermark is a same type of watermark as the second watermark;

determining that the third watermark corresponds to the second media presentation; and updating the new ongoing media presentation record in the watermark data structure to end at a time corresponding to the second watermark being detected when the bridge time between the detecting of the second watermark and the detecting of the third watermark exceeds the bridge timer threshold.

\* \* \* \* \*